United States Patent [19]

Conway

[11] Patent Number: 4,890,217
[45] Date of Patent: Dec. 26, 1989

[54] UNIVERSAL POWER SUPPLY, INDEPENDENT CONVERTER STAGES FOR RESPECTIVE HARDWARE COMPONENTS OF A COMPUTERIZED SYSTEM

[75] Inventor: David W. Conway, Cedar Rapids, Iowa

[73] Assignee: Norand Corporation, Cedar Rapids, Iowa

[21] Appl. No.: 312,404

[22] Filed: Feb. 17, 1989

Related U.S. Application Data

[63] Continuation of Ser. No. 225,558, Jul. 26, 1988, abandoned, which is a continuation-in-part of Ser. No. 60,680, Jun. 10, 1987, abandoned.

[51] Int. Cl.⁴ ............................................. H02M 7/04
[52] U.S. Cl. ........................................ 363/143; 363/21
[58] Field of Search ......................... 363/21, 142, 143; 307/11, 23, 26

[56] References Cited

U.S. PATENT DOCUMENTS

| | | | |
|---|---|---|---|
| 4,313,060 | 1/1982 | Fickenscher et al. | 307/23 |
| 4,315,303 | 2/1982 | Snyder | 363/21 |
| 4,389,702 | 6/1983 | Clemente et al. | 363/21 |
| 4,459,651 | 7/1984 | Fenter | 363/21 |
| 4,590,546 | 5/1986 | Maile | 363/37 |
| 4,686,616 | 8/1987 | Williamson | 363/21 |

OTHER PUBLICATIONS

Yasumatsuya et al., "AC—DC Switched Mode Power Supply in Color Television Receiver for France", National Technical Report, vol. 20, No. 6, pp. 801-809, (Dec. 1974).

Primary Examiner—William M. Shoop, Jr.
Assistant Examiner—Marc S. Hoff
Attorney, Agent, or Firm—Neuman, Williams, Anderson & Olson

[57] ABSTRACT

In a point of sale terminal it was desired to incorporate a variety of input/output devices, e.g. CRT display, disk drives and a printer in a compact hosuing, e.g. about 16 inches wide by 12 inches in depth (without frontally projecting keyboard) by about 11 inches high. The illustrated switching power supply occupies a rectilinear space of less than 155 cubic inches and has the capability of operating from either 110 or 220 VAC, 50 or 60 hertz, or from battery power, with essentially constant volt-second product, while supplying a maximum average output power greater than 120 watts, and a peak output power of greater than 280 watts.

24 Claims, 34 Drawing Sheets

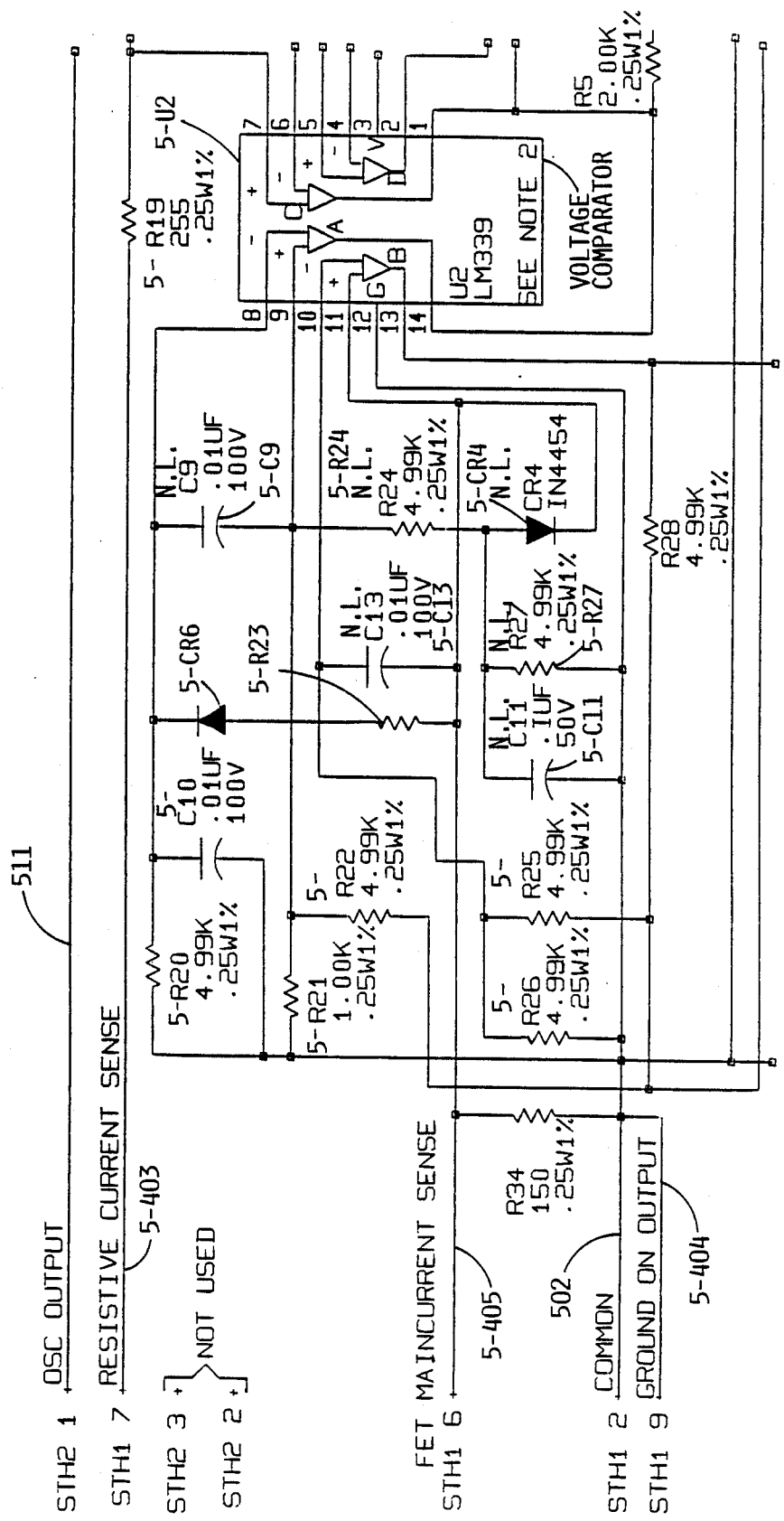

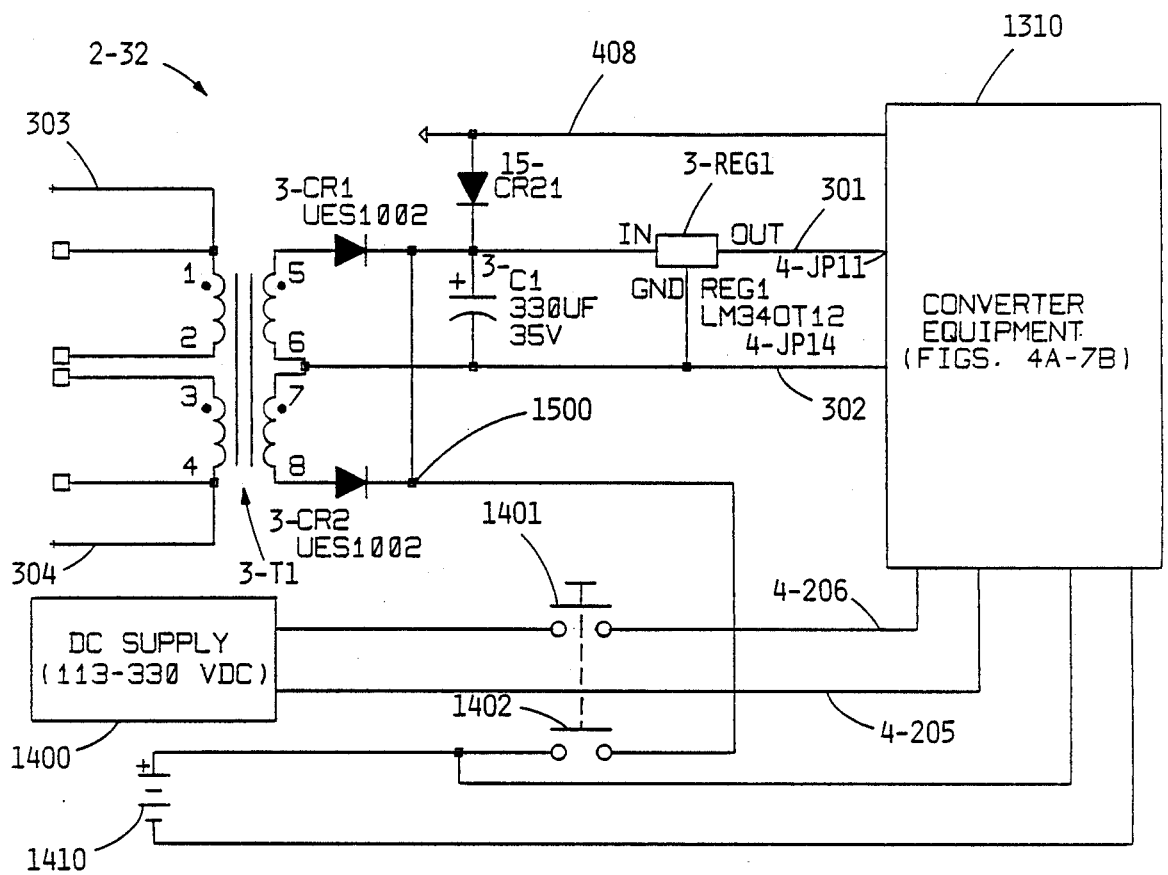
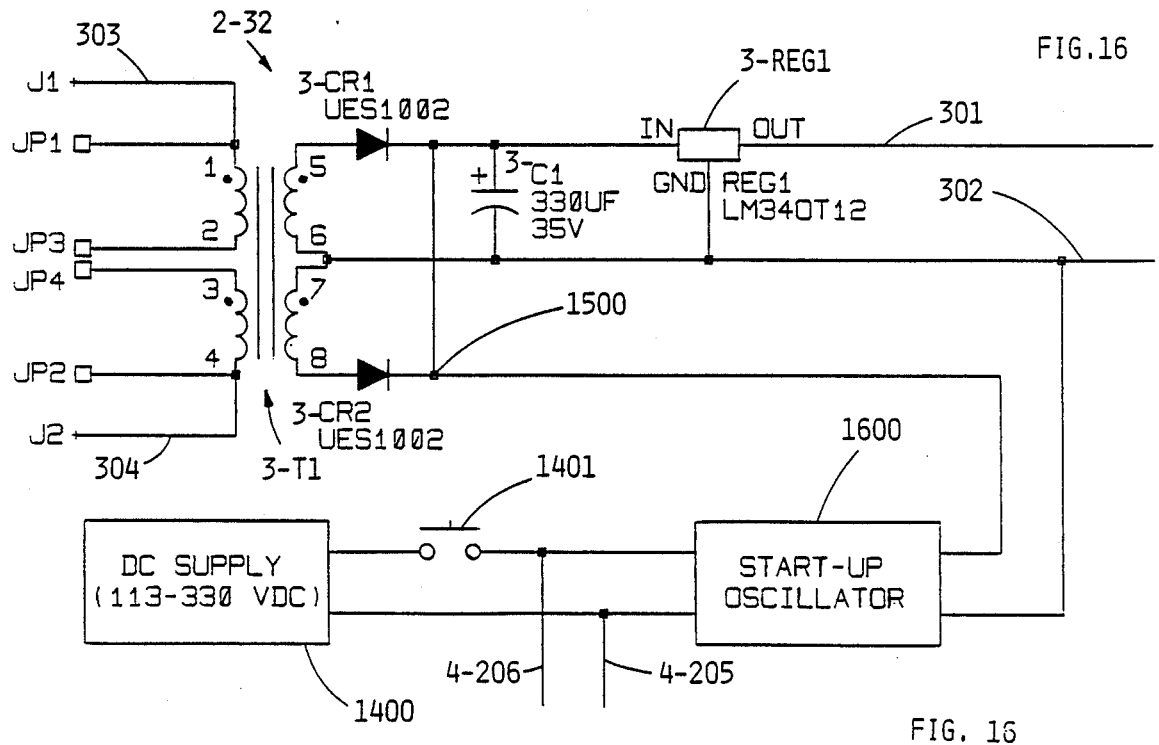
FIG. 15
FIG. 16

UNIVERSAL POWER SUPPLY, INDEPENDENT CONVERTER STAGES FOR RESPECTIVE HARDWARE COMPONENTS OF A COMPUTERIZED SYSTEM

CROSS-REFERENCE TO RELATED APPLICATIONS

The present application is a continuation of Ser. No. 07/225,558 filed July 26, 1988, which in turn is a continuation in part of Ser. No. 07/060,680 filed June 10, 1987, now abandoned.

BACKGROUND OF THE INVENTION

This invention relates to a power supply construction, and particularly to a power supply unit suitable for incorporation into a compact point of sale console or similar computerized device.

A point of sale terminal has been developed incorporating a keyboard, video display, computer processor, and peripherals such as a printer and disk drive. It would be desirable to have a reduced size power supply capable of supplying power to the components of the system, adaptable to different power sources, and capable of reliable operation in spite of power failures and widely fluctuating supply voltage.

SUMMARY OF THE INVENTION

It is an object of the invention to provide a universal power supply of particularly compact construction.

An embodiment of power supply in accordance with the present invention makes it possible to house all components of a point of sale system with the power supply in a unitary console unit with a small footprint, and to market the console throughout the world without any change in its power receptacle or circuit.

For example, the illustrated embodiment herein has a standard receptacle which will receive either a 110 volt AC or a 220 volt AC line cord and 50 or 60 hertz without requiring any adjustment. The same power supply may also be operated from direct current power at voltages between 100 volts DC and 320 volts DC, for example.

Another object of the invention relates to the provision of a power supply wherein the power supply transformer operates with essentially constant volt second product over a wide range of input voltages, e.g. for upper and lower voltage amplitudes having a ratio of two to one, or greater.

A further object of the invention resides in the provision of a universal power supply capable of operation at both 110 volts and 220 volts AC or DC, and effective to sustain operation of a point of sale system or similar computerized system without interruption in the event of temporary power failures and in spite of wide fluctuations in supply voltage.

Exemplary features of the illustrated embodiment include operating the power supply transformer at a switching frequency in excess of eighty kilohertz; provision of a simplified power supply transformer construction through the use of a resistive reset current path; the provision of a circuit layout wherein an auxiliary plug-in circuit board with switching control circuitry may be tested prior to assembly with the main power supply board; and provision of a power supply configuration of high efficiency such that standby battery means may have a reduced capacity.

A still further object of the invention is to provide an economical, compact, reliable and efficient power supply for a computerized point of sale console or the like incorporating one or more of the foregoing features of the illustrated embodiment.

Other objects, features and advantages of the present invention will be apparent from the following detailed description taken in connection with the accompanying sheets of drawings, and from the individual features of the respective appended claims.

BRIEF DESCRIPTION OF THE DRAWINGS

FIGS. 5A–5C show an exemplary electric circuit diagram for implementing a controller section of the power supply of FIG. 2A, FIG. 5B being a continuation of FIG. 5A to the right, and FIG. 5C being a continuation of FIG. 5A in the downward direction and a continuation of FIG. 5B to left;

FIGS. 6A–6I show an exemplary electric circuit for implementing the output section of the power supply of FIGS. 2B and 2C, FIG. 6B being a continuation of FIG. 6A to the right, FIG. 6C being a continuation of FIG. 6B to the right, FIG. 6D being a continuation of FIG. 6A in the downward direction, FIG. 6E being a continuation of FIG. 6D to the right and a continuation of FIG. 6B in the downward direction, FIG. 6F being a continuation of FIG. 6E to the right, FIG. 6G being a continuation of FIG. 6D in the downward direction, FIG. 6H being a continuation of FIG. 6G to the right and a continuation of FIG. 6E in the downward direction, and FIG. 6I being a continuation of FIG. 6H to the right;

FIG. 15 is a diagrammatic view illustrating a second embodiment wherein battery potential is momentarily applied to a portion of the circuitry of FIGS. 3 and 13, to effect start-up, where opertion is otherwise effected with the use of a DC supply; and FIG. 16 is a diagrammatic view illustrating a preferred embodiment wherein start-up and continued operation are effected from a DC supply without the use of momentary battery potential as in FIGS. 14 and 15.

DETAILED DESCRIPTION

Figure 1:
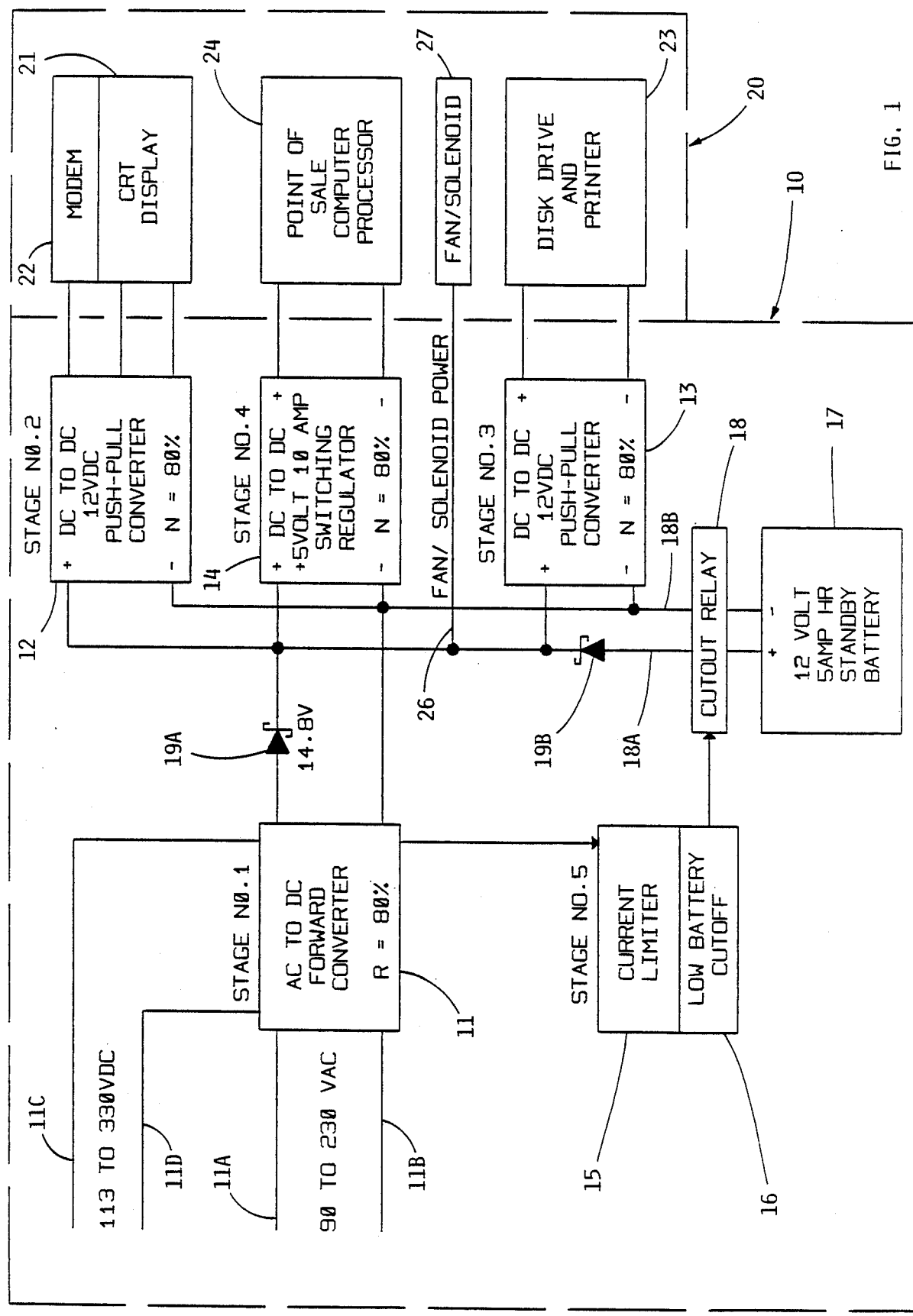
FIG. 1 is a block diagram illustrating a power supply unit which forms part of a unitary point of sale console along with a computer processor and various computer peripherals.

FIG. 1 shows an exemplary power supply arrangement 10 in accordance with the present invention including the following components:

| | |
|---|---|
| Stage No. 1 | AC to DC Forward Convertor 11 |
| Stage No. 2 | DC to DC Twelve Volt Push-Pull convertor 12 |
| Stage No. 3 | DC to DC Twelve Volt Push-Pull convertor 13 |

Input power lines 11A, 11B may receive input AC voltages between ninety, and two hundred and fifty volts r.m.s. at fifty to sixty hertz. DC power input lines 11C and 11D may supply DC input voltages between about one hundred and thirteen volts and about three hundred and thirty volts, for example.

A power "OR" gate is shown in FIG. 1 and is comprised of Schottky isolation diodes 19A and 19B Diode 19B provides for instantaneous switchover to the standby battery 17 in the event of a complete or partial interruption of AC line power. During such power failures, diode 19B becomes forward biased while diode 19A becomes reverse biased, preventing current flow from the battery 17 into the output circuitry of component 11.

In an exemplary embodiment components 12, 13 and 14 may supply operating power to elements 21–24 of a computerized point of sale system 20, as indicated in FIG. 1, the salient parameters of such an arrangement being outlined as follows:

Stage No. 2—Convertor 12

Plus twelve volts to a cathode ray tube display 21, with a typical output power of 15.0 watts, and a maximum output power of 30.0 watts.

Minus twelve volts to a modem device 22, with a typical output power of 0.5 watt, and a maximum output power of 1.2 watts.

Stage No. 3—Convertor 13

Plus twelve volts to a disk drive/printer represented by block 23, with a typical output power of zero watts, and a maximum output power of twenty-eight watts.

Stage No. 4—Switching Regulator 14

Plus five volts to computer processor circuits 24, with a typical output power of 22.5 watts and a maximum output power of fifty watts.

Stage No. 1, convertor 11, may also supply power via a line 26 to a fan/solenoid represented by block 27, with a typical output power of two watts and a maximum output power of thirteen watts (pulse).

The total typical output power for this example is thus forty watts, with a total average maximum output power of about one hundred and twenty-two watts, (and with two hundred and eighty-eight watts peak output power).

Figure 2A:
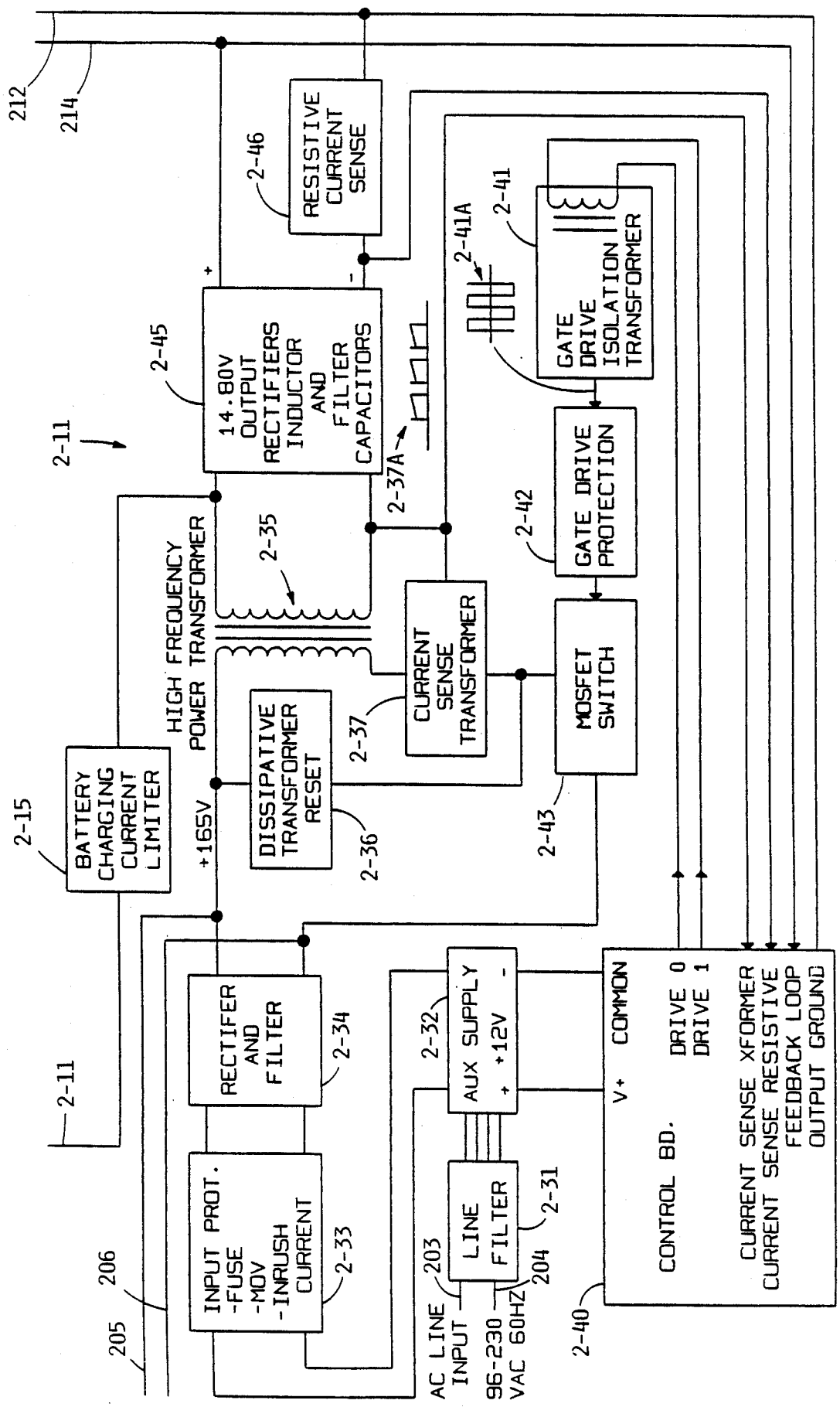
FIGS. 2A, 2B and 2C show a more detailed block diagram of an exemplary power supply unit in accordance with the present invention, FIG. 2B representing a continuation of FIG. 2A in the upward direction, and FIG. 2C being a continuation of FIG. 2B in the upward direction.
Figure 2B:
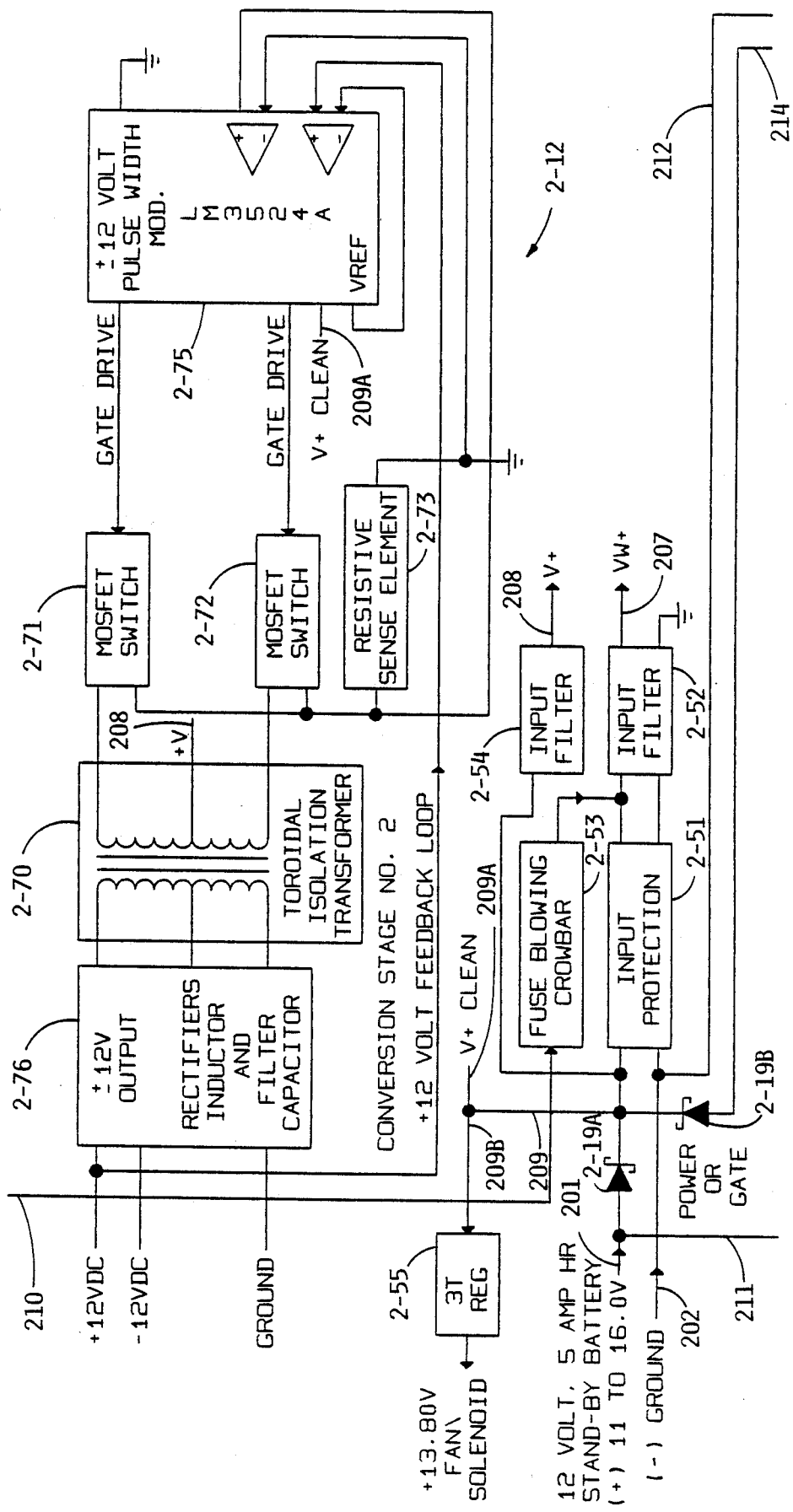
Figure 2C:
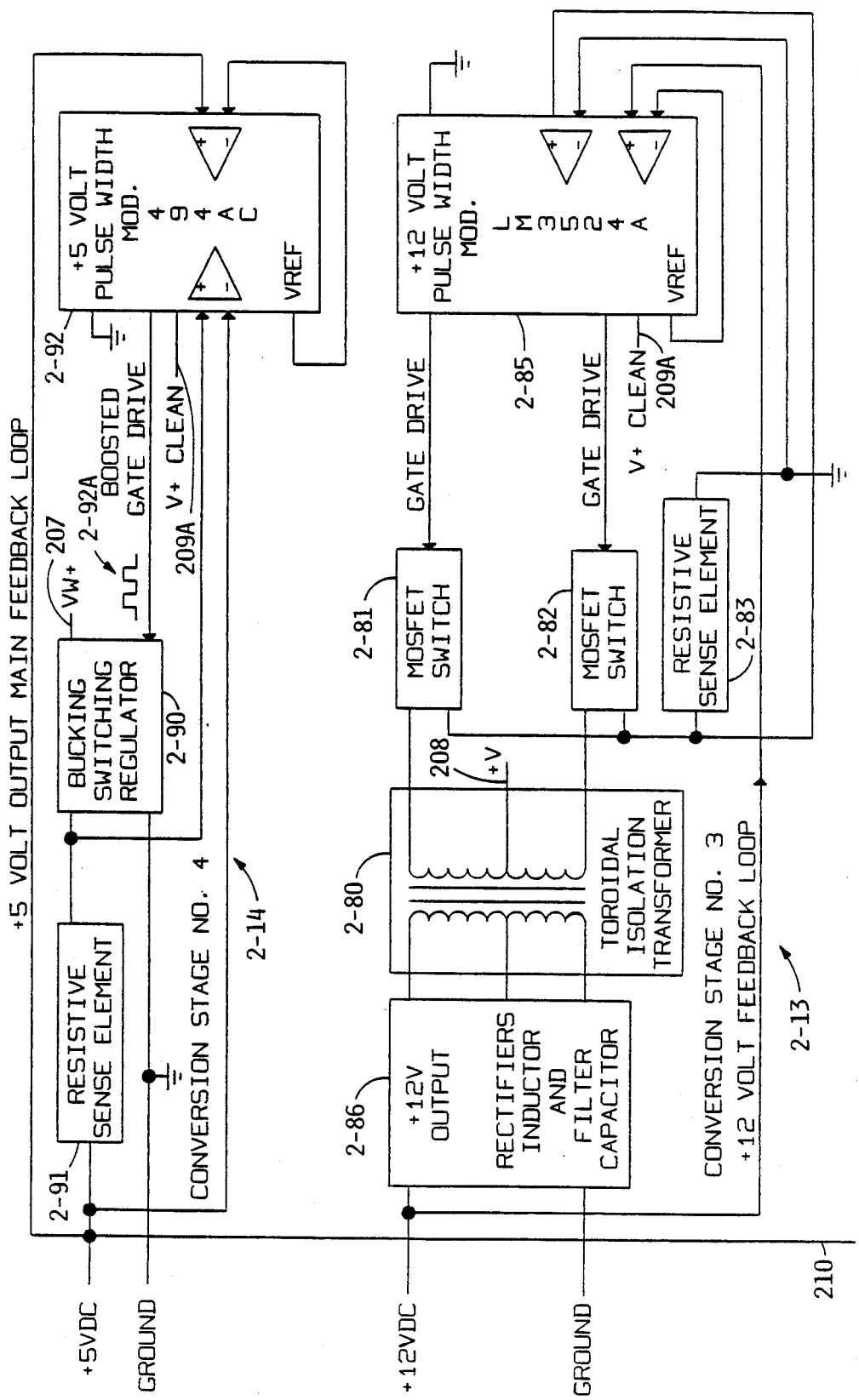

Ddescription of FIGS. 2A, 2B and 2C

FIGS. 2A, 2B and 2C show in greater detail an exemplary implementation of a universal power supply according to FIG. 1, wherein reference numeral 2-11, FIG. 2A, designates an AC to DC forward convertor stage corresponding to component 11 of FIG. 1, reference numerals 2-12 and 2-13, FIG. 2B, designate DC to DC push-pull convertor stages corresponding to components 12 and 13, FIG. 1, and reference numeral 2-14, FIG. 2C, designates a DC to DC switching regulator corresponding to component 14, FIG. 1. Battery charging current limiter 2-15, FIG. 2A, corresponds with component 15 of FIG. 1, and lines 201 and 202 may connect with components 17 and 18, FIG. 1, and may correspond generally with leads 18A and 18B, FIG. 1. The power "OR" gate 2-19A, 2-19B corresponds with gate 19A, 19B, FIG. 1.

Input lines 203 and 204, FIG. 2A, may receive an AC line voltage between ninety volts r.m.s. (90 VAC) and two hundred and fifty volts r.m.s. (250 VAC), and input lines 205 and 206 may receive a DC input voltage between about one hundred and thirteen volts (113 VDC) and about three hundred and thirty volts (330 VDC).

The individual components of FIGS. 2A, 2B and 2C are identified in the following tabulation and are grouped so as to generally indicate their association with one of the power supply stages where applicable:

AC to DC Convertor 2-11, FIG. 2A

Line Filter 2-31
Auxiliary Supply 2-32
Input Protection 2-33
Rectifier and Filter 2-34
High Frequency Power Transformer 2-35
Dissipative Transformer Reset 2-36
Current Sense Transformer 2-37

Pulse Width Modulation Controller 2-40
Gate Drive Isolation Transformer 2-41
Gate Drive Protection 2-42
MOSFET Switch 2-43
Output Rectifier, Inductor and
Filter Capacitor Circuitry 2-45
Resistive Current Sense 2-46

Additional Components, FIG. 2A and FIG. 2B

Battery Charging Current Limiter 2-15 (for battery charging stage No. 5; see FIG. 1)

Input Protection 2-51 (for stages No. 2, 3 and 4, components 2-12, 2-13 and 2-14, FIG. 2B and FIG. 2C)

Input Filter 2-52 (for push-pull convertor stages 2-12 and 2-13, FIG. 2B and FIG. 2C)

Fuse Blowing Crowbar 2-53 (for switching regulator stage 2-14, FIG. 2C)

Input Filter 2-54 (for switching regulator stage 2-14, FIG. 2C)

Regulator 2-55 (for supplying fan and solenoid power; see component 27, FIG. 1)

Output 207 (Vw+) supplies switching regulator 2-14, FIG. 2C, while output 208 (V+) supplies the push-pull convertor stages 2-12 and 2-13, FIG. 2B and FIG. 2C.

Output line 209 from the power "OR" gate 2-19A, 2-19B, is shown as supplying pulse width modulation controller chips of FIG. 2B and FIG. 2C via a first branch 209A (V+CLEAN) and supplying regulator 2-55, via a second branch 209B. A line 210 supplies a measure of the output of switching regulator 2-14 to the fuse blowing crowbar 2-53. Line 211 connects current limiter 2-15, FIG. 2A, with line 201, FIG. 2B. Line 212 in FIGS. 2A and 2B is a ground line connected with line 202, FIG. 2B. Line 214, FIGS. 2A and 2B, is a power output line leading from converter stage 2-11 to the anode of rectifier 2-19B.

Waveform 2-37A, FIG. 2A, represents the output from current sense transformer 2-37, and waveform 2-41A, FIG. 2A, represents the output from gate drive isolation transformer 2-41.

Push-Pull Convertor Stages 2-12 and 2-13, FIG. 2B and FIG. 2C

Toroidal Isolation Transformers 2-70, 2-80
MOSFET Switches 2-71, 2-72, 2-81, 2-82
Resistive Sense Elements 2-73, 2-83
Pulse Width Modulation Controllers 2-75, 2-85
Output Rectifier, Inductor and
Filter Capacitor Circuitry 2-76, 2-86

Switching Regulator Stage 2-14, FIG. 2C

Bucking Switching Regulator 2-90
Resistive Sense Element 2-91
Pulse Width Modulation Controller 2-92
Waveform 2-92A represents a boosted gate drive output from controller 2-92.

Description of FIGS. 3, 4A, 4B, 5, 6A, 6B, 7A and 7B

Figure 3:
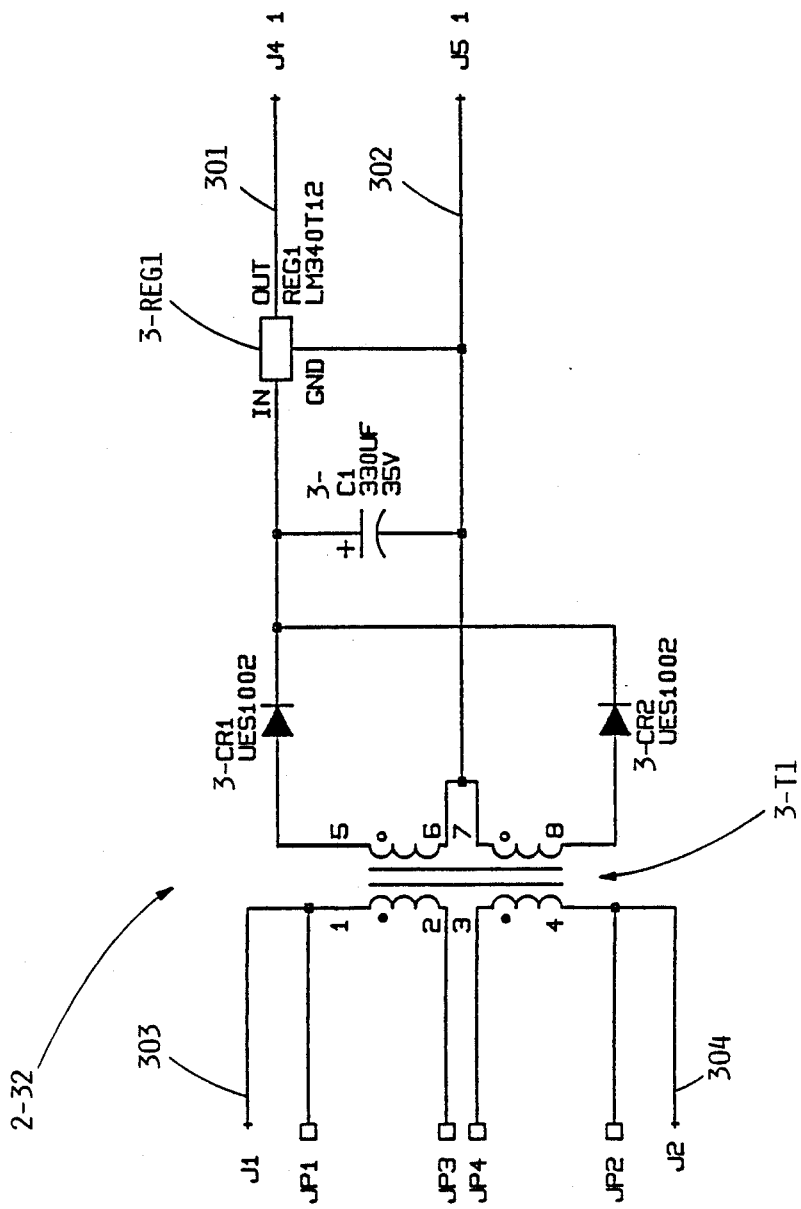
FIG. 3 shows an exemplary electric circuit diagram for implementing an auxiliary supply component of FIG. 2A.

By way of example, a detailed implementation of the arrangement of FIGS. 2A, 2B and 2C is shown in FIGS. 3, 4A, 4B, 5, 6A, 6B, 7A and 7B. The parts lists for a successfully operating system are as follows:

FIG. 3 - AUXILIARY SUPPLY 2-32
Parts List, FIG. 3

| Reference Designator | Description |
|---|---|
| 3-C1 | CAP, 35V 20% 330UF* |
| 3-T1 | XFMR, 115/230V-12V/.2A |
| 3-CR1,3-CR2 | RECTIFIER, UES1002 |
| 3-REG 1 | +12V REG LM340T-12 |
| Z4 | ZENER IN4990 |
| Z3 | ZENER, IN4992 |
| 4-Q7 | XSTR PNP-2N3906 |
| 6-Q2,Q3,Q4,Q5 | XSTR, PWR FET-BUZ71A |
| 6-SCR1 | XSTR,8A,50V-2N4441 |
| 6-Q1 | XSTR,FET-BUZ11A |
| 4-Q6 | XSTR,PWR FET-BUZ330 |
| 4-K1 | REL,2 POLE,12V,10A |
| 6-T1,4-T4 | XFMR,DSC.12V/2A |
| 6-T4 | XFMR,2/24A 5/50KHZ |
| 4-T5 | XFMR,120V/40V |
| 4-T3 | XFMR,10V-1:1 RATIO |
| 4-BRD1 | RECT,600V/8A-SIP |
| 6-CR3 | RECTIFIER, 16A-USD940 |
| 4-CR17A,4-CR17B | RECTIFIER, 16A-UDS740 |
| 6-CR7A 7B,9A,9B | RECTIFIER, UES2402 |
| CR5,6,10,11,18 | RECTIFIER, 1A-IN5615 |
| 4-CR13 | RECT.,800V/2A-AXIAL |
| CR15,4-CR16A, 4-CR16B | RECT.150V/16A-2403 |
| L2 | CHOKE,TORROID-60 UH** |
| 6-L3,6-L4 | CHOKE, TORROID-130UH |
| L1 | CHOKE, TORROID-13 UH |
| 6-FB1,FB2,FB3,FB4 | BEAD,FERRITE-.298OD |
| 6-T6 | CHOKE,XMFR-10A 50UH |
| 4-L6 | CHOKE, 8A 80UH |
| 4-T7 | CHOKE, EMI-3MH*** |
| 4-J3 | CONN FASTON TAB-PCBD |
| J1 | HEADER, 9P-MNL |
| 6-F1,4-F2 | FUSE, 10A-125V-FB |
| F3 | FUSE, 15A-125V-FB |
| 6-REG1 | 3T REG LM320T-12 |
| 6-REG2 | +12V REG LM340T-12 |
| 4-REG3 | REGULATOR, LM317T |

Figure 5B:
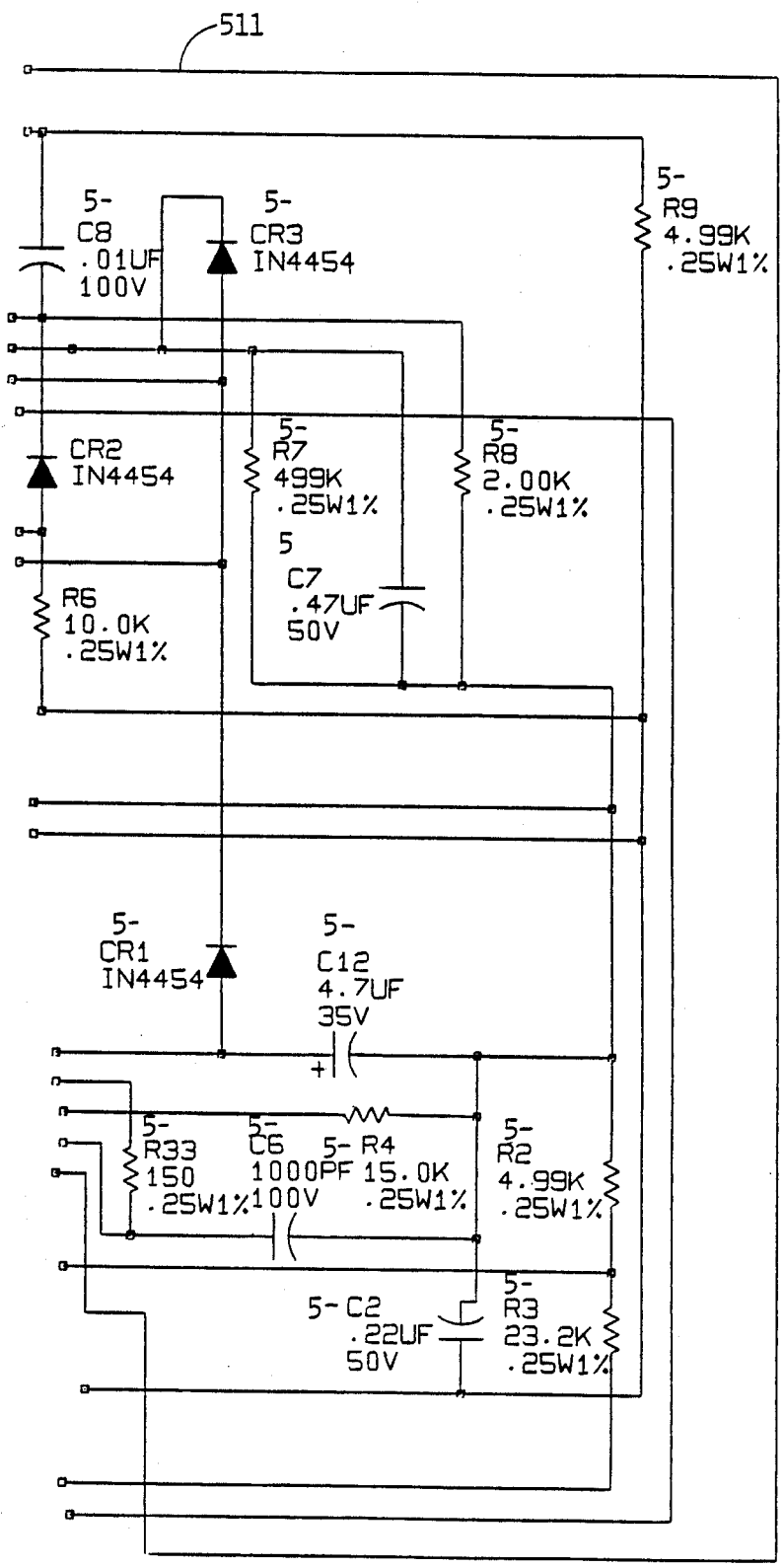
Figure 5C:
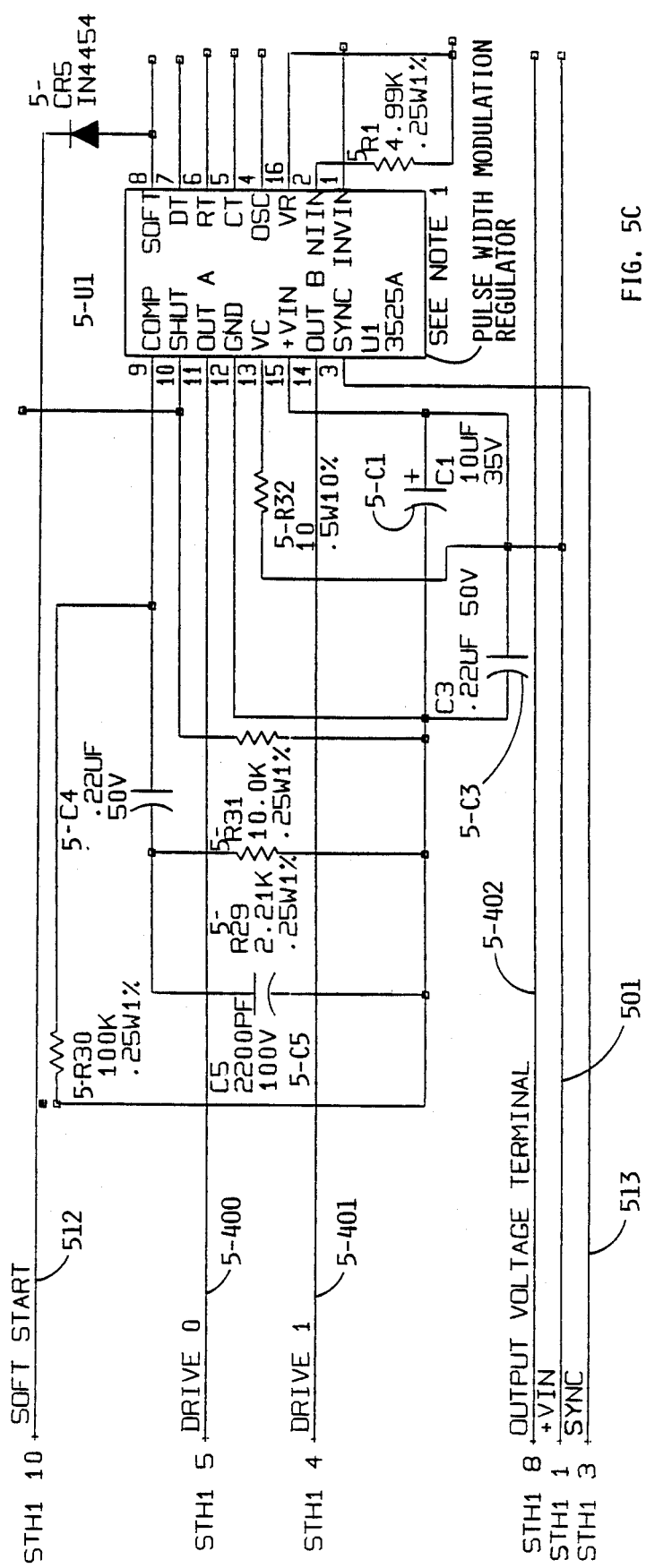

*"UF" stands for microfarad(s)
**"UH" stands for Microhenries
***"MH" stands for millihenries
****"PF" stands for Picofarads FIG. 5 - CONTROLLER
Parts List, FIG. 5

| Reference Designator | Description |
|---|---|
| 5-R32 | RES ¼W 10% 10 OHMS |
| 5-R33 | RES ¼W 1% 10.0 OHMS |
| 5-R34 | RES ¼W 1% 150 OHMS |
| 5-R19 | RES ¼W 1% 402 OHMS |
| 5-R23 | RES ¼W 1% 1.50K OHMS |
| 5-R5,8 | RES ¼W 1% 2.00K OHMS |
| 5-R26 | RES ¼W 1% 2.49K OHMS |
| 5-R21,29 | RES ¼W 1% 3.01K OHMS |
| 5-R1,2,9,22,25,28 | RES ¼W 1% 4.99K OHMS |
| 5-R4 | RES ¼W 1% 7.5K OHMS |
| 5-R3 | RES ¼W 1% 9.53K OHMS |
| 5-R6,31 | RES ¼W 1% 10.0K OHMS |

Figure 4A:
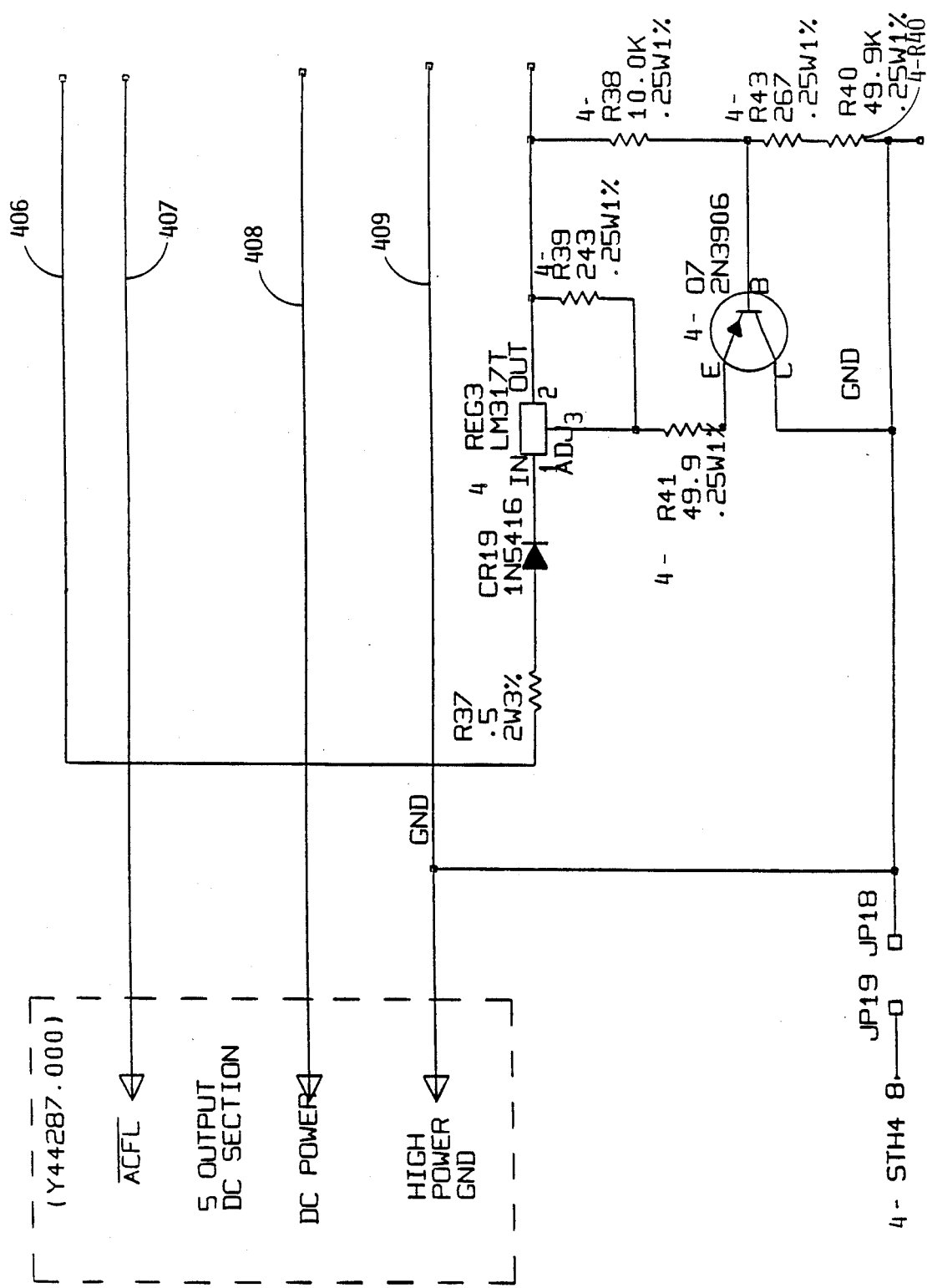
FIGS. 4A–4F show an exemplary electric circuit for the AC/DC section of the power supply unit of FIG. 2A, FIG. 4B being a continuation of FIG. 4A to the right, FIG. 4C being a continuation of FIG. 4B to the right, FIG. 4D being a continuation of FIG. 4A in the downward direction, FIG. 4E being a continuation of FIG. 4D to the right and a continuation FIG. 4B in the downward direction, and FIG. 4F being a continuation of FIG. 4E to the right and being a continuation of FIG. 4C in the downward direction.
Figure 4B:
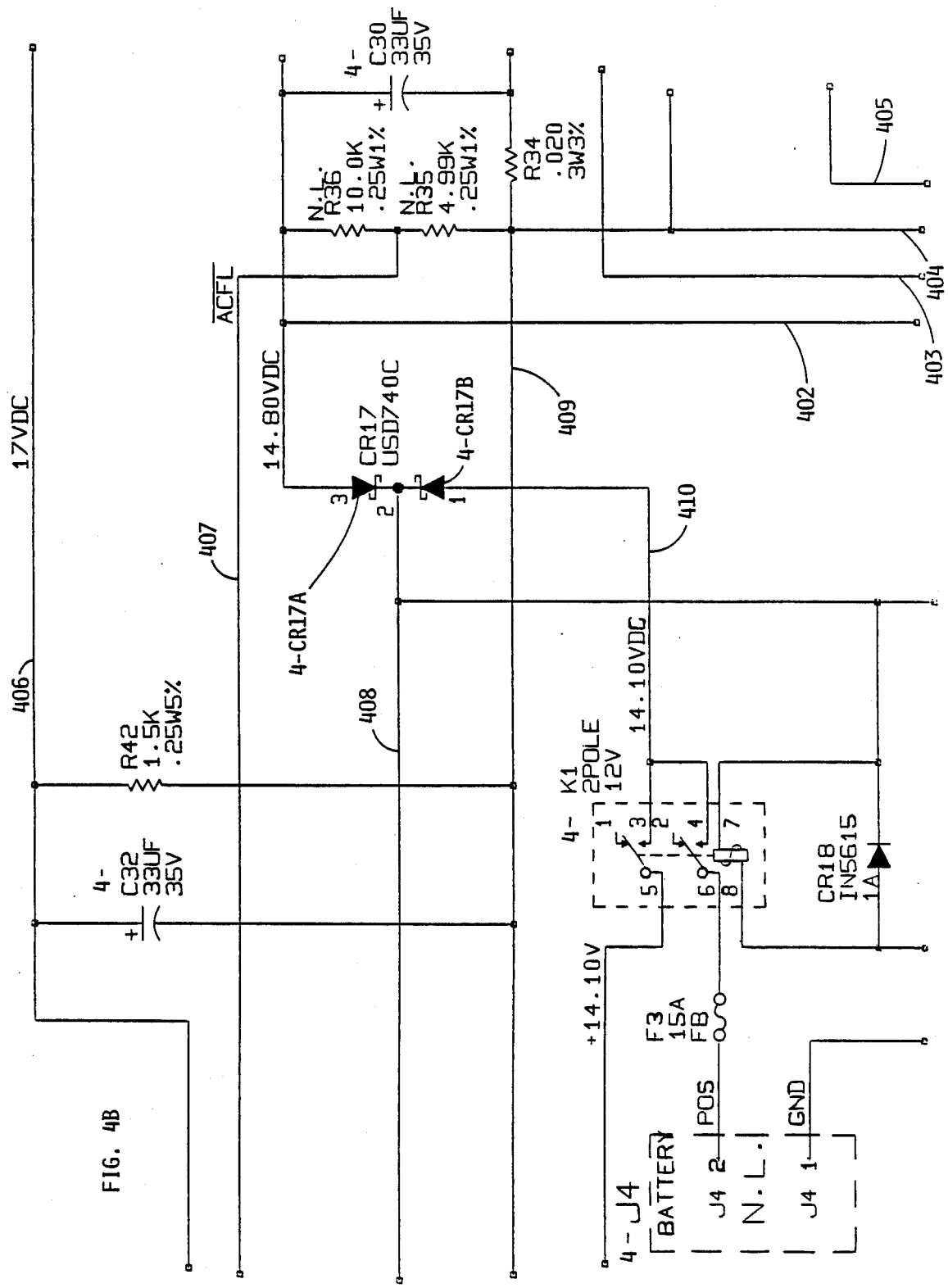
Figure 4C:
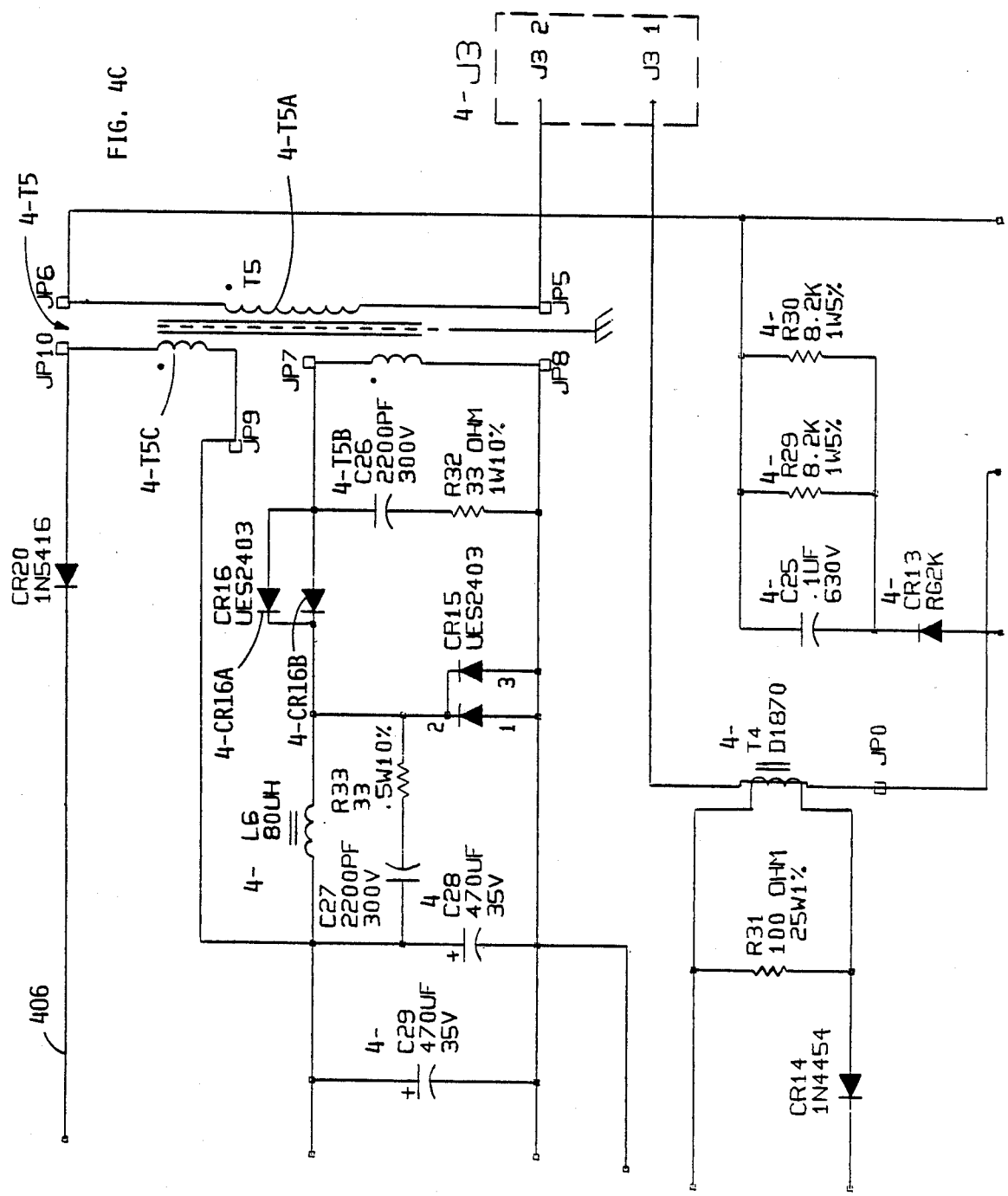
Figure 4D:
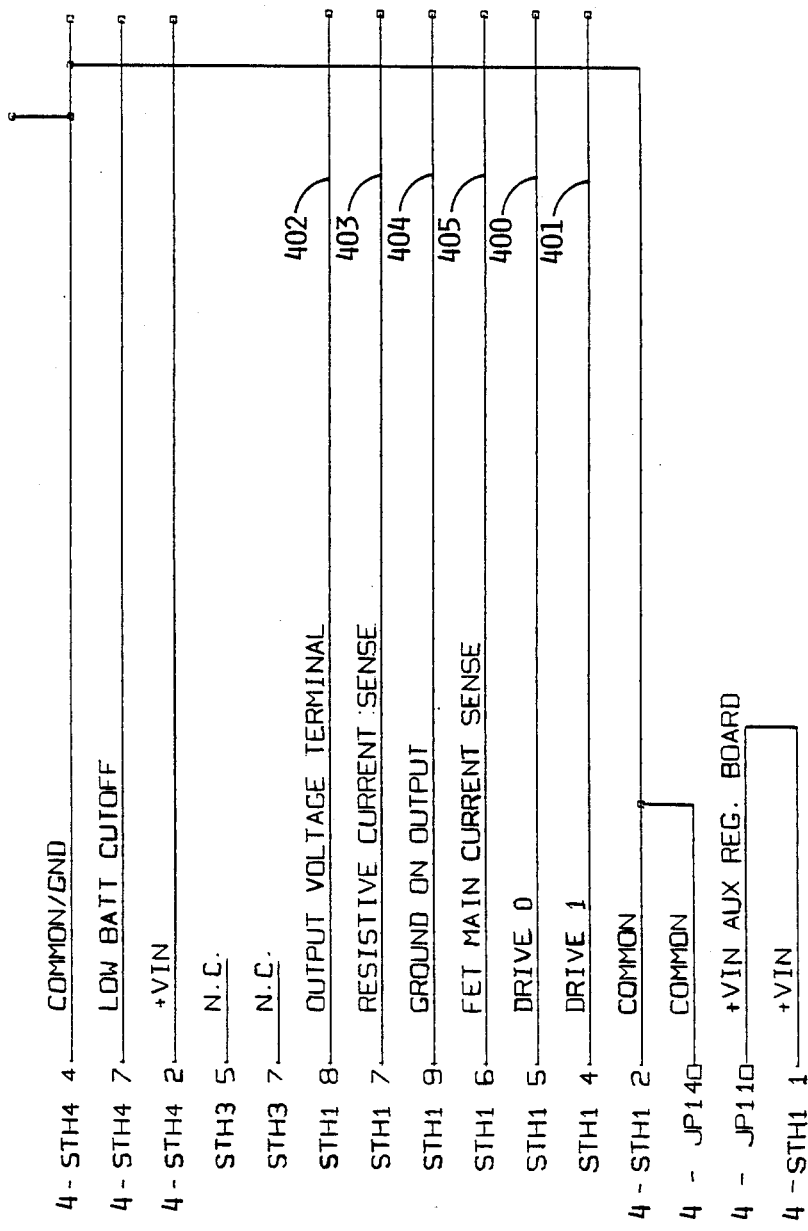
Figure 4E:
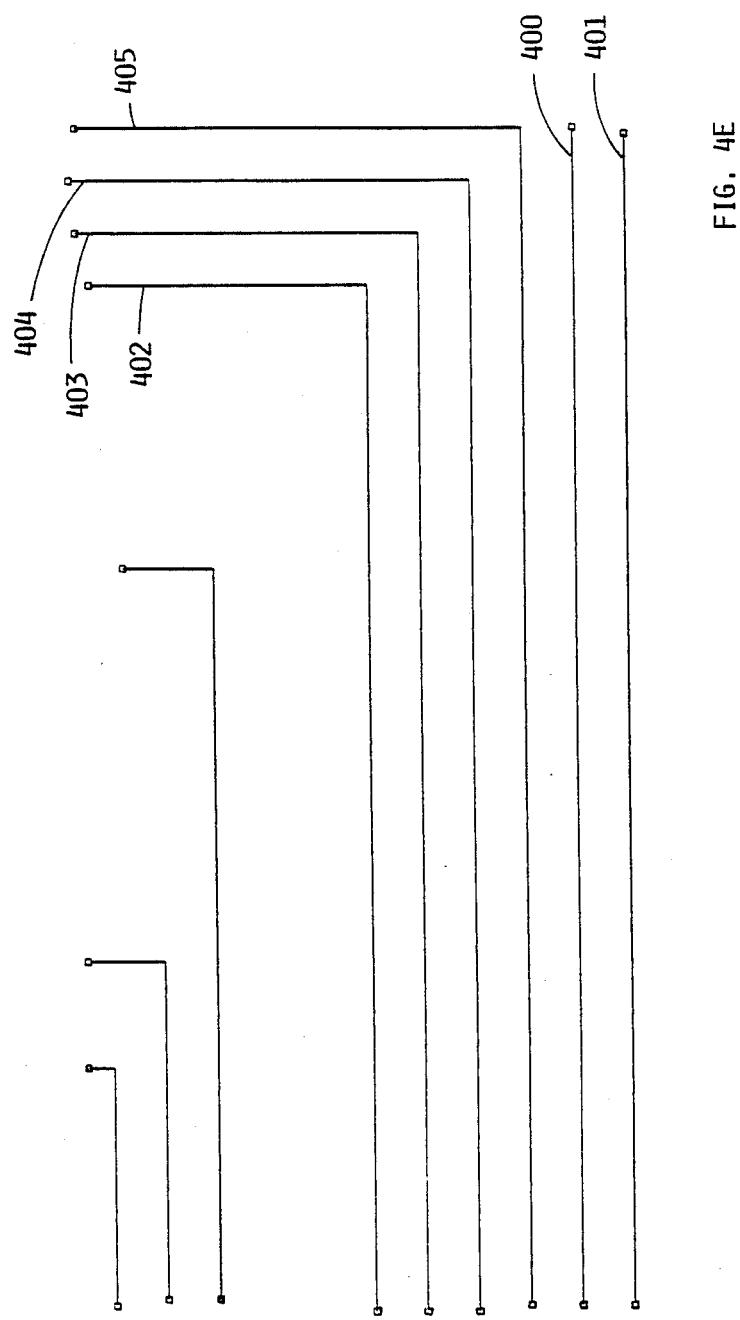
Figure 6A:
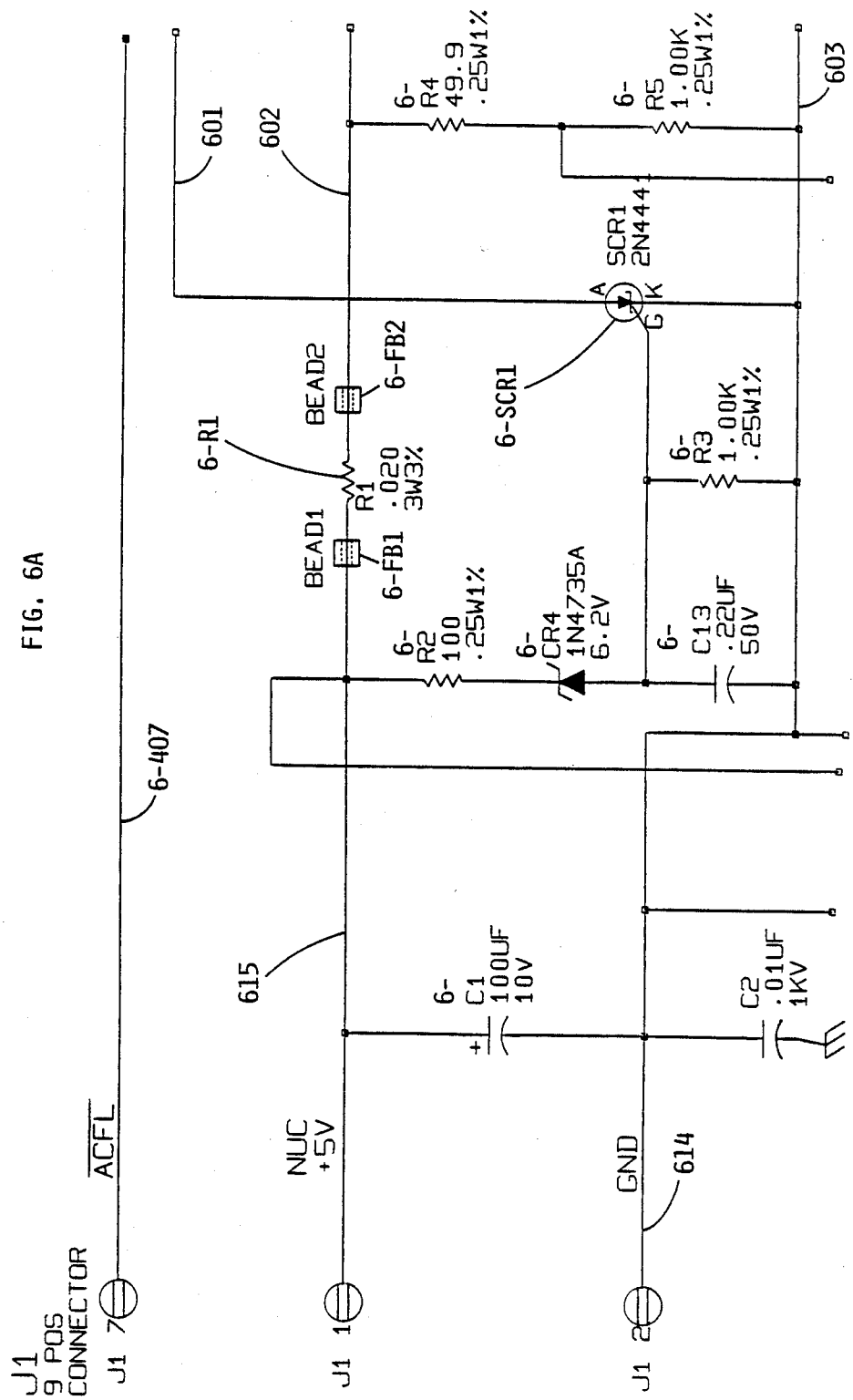
Figure 6B:
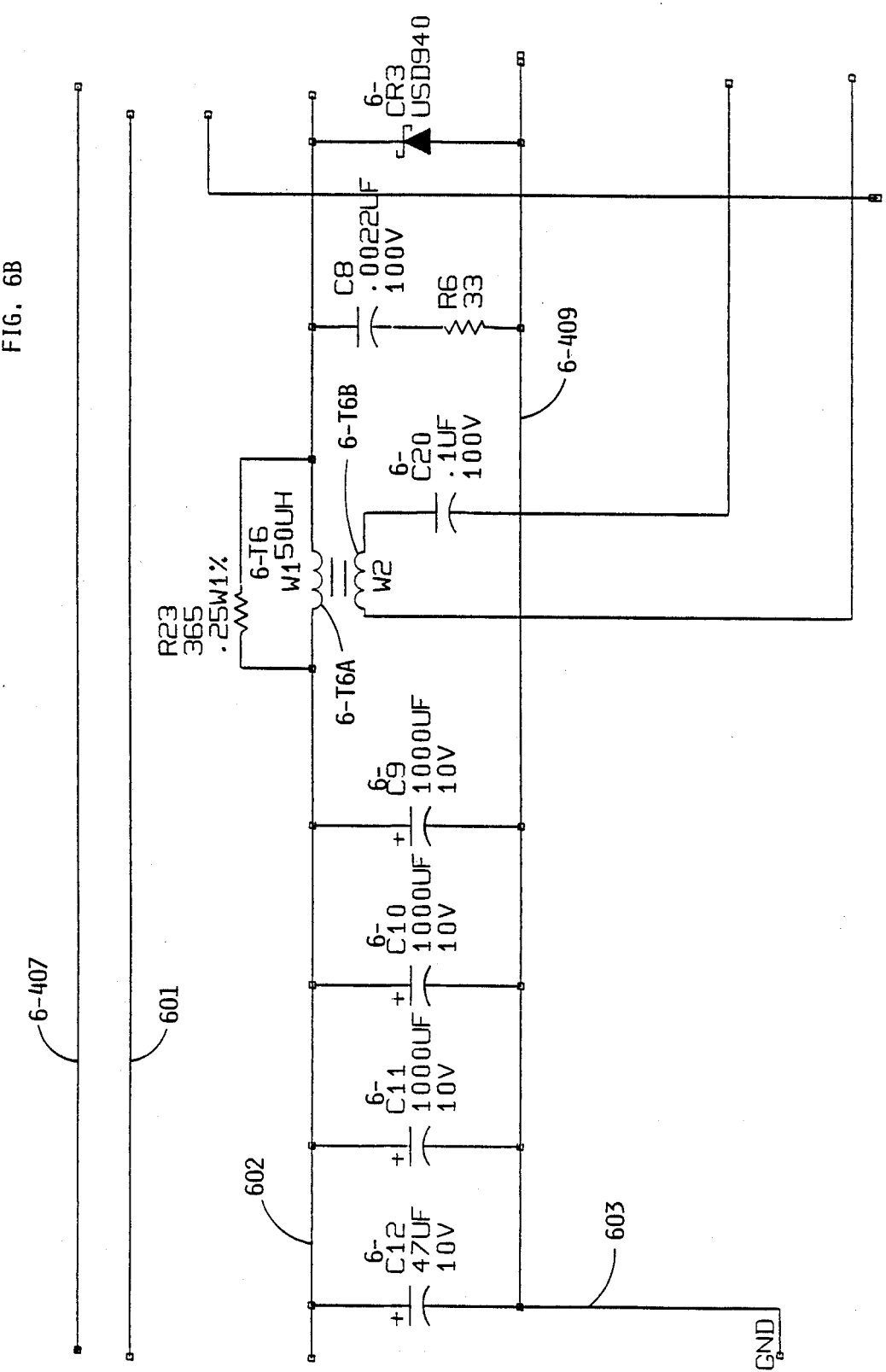
Figure 6C:
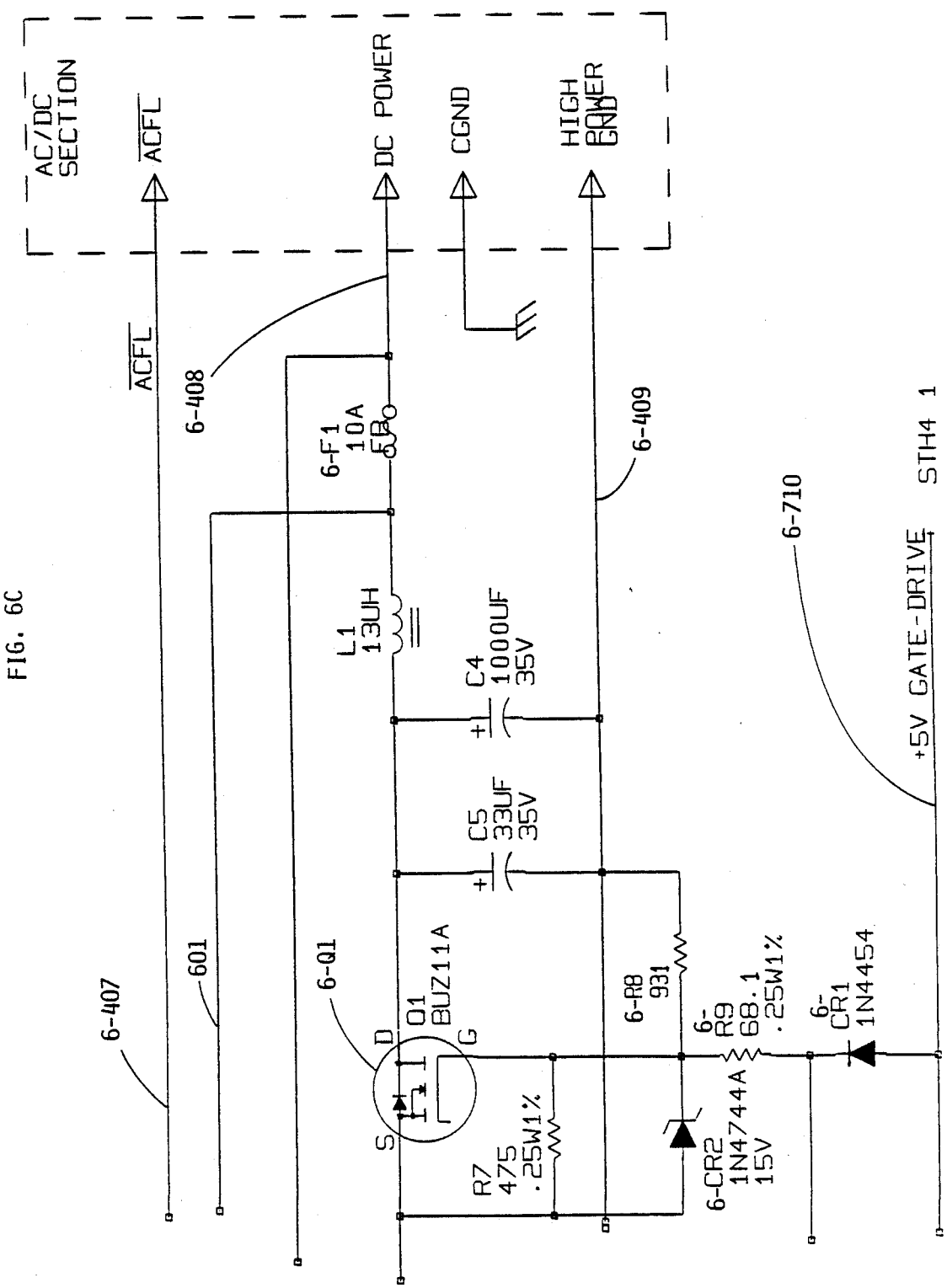
Figure 6D:
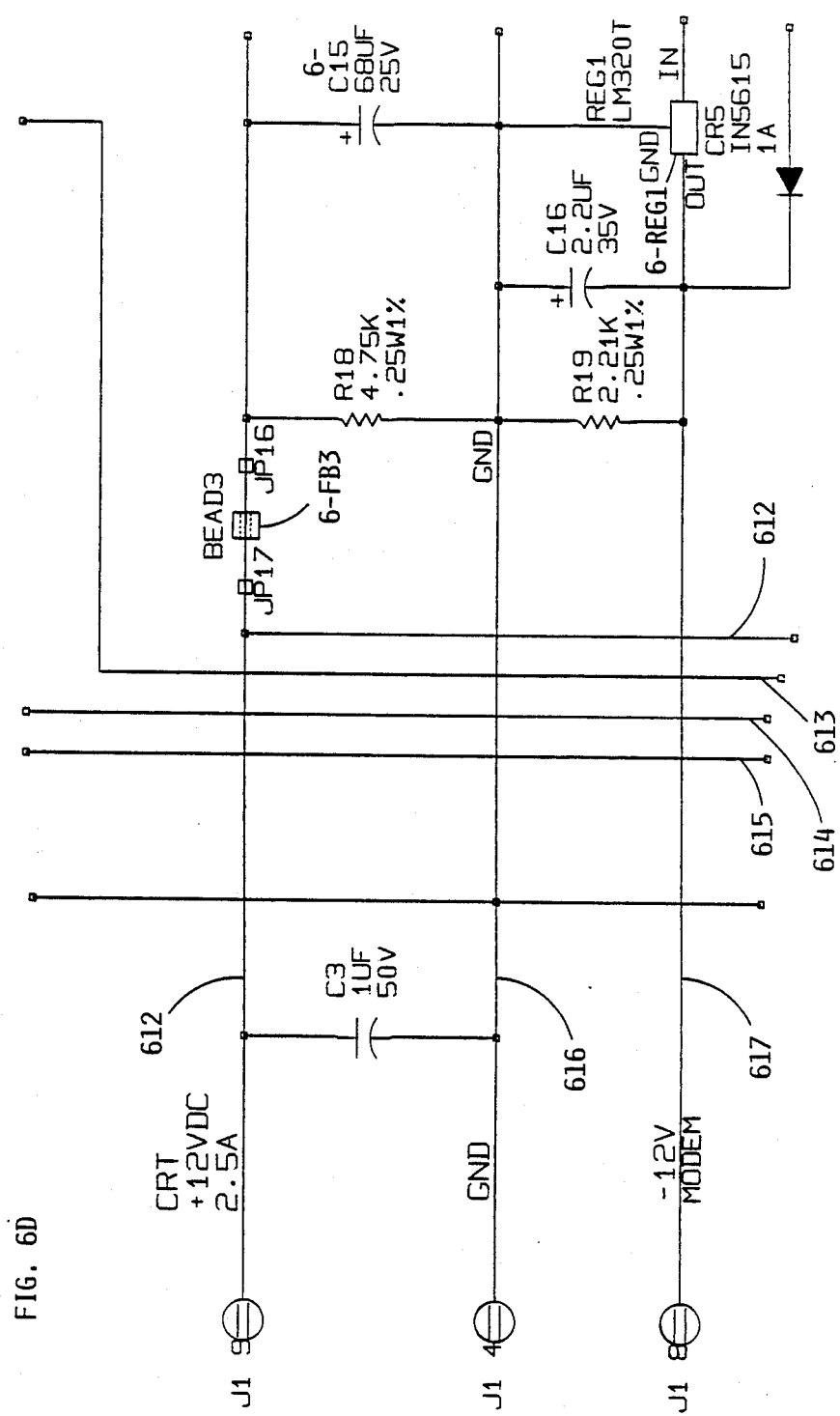
Figure 6E:
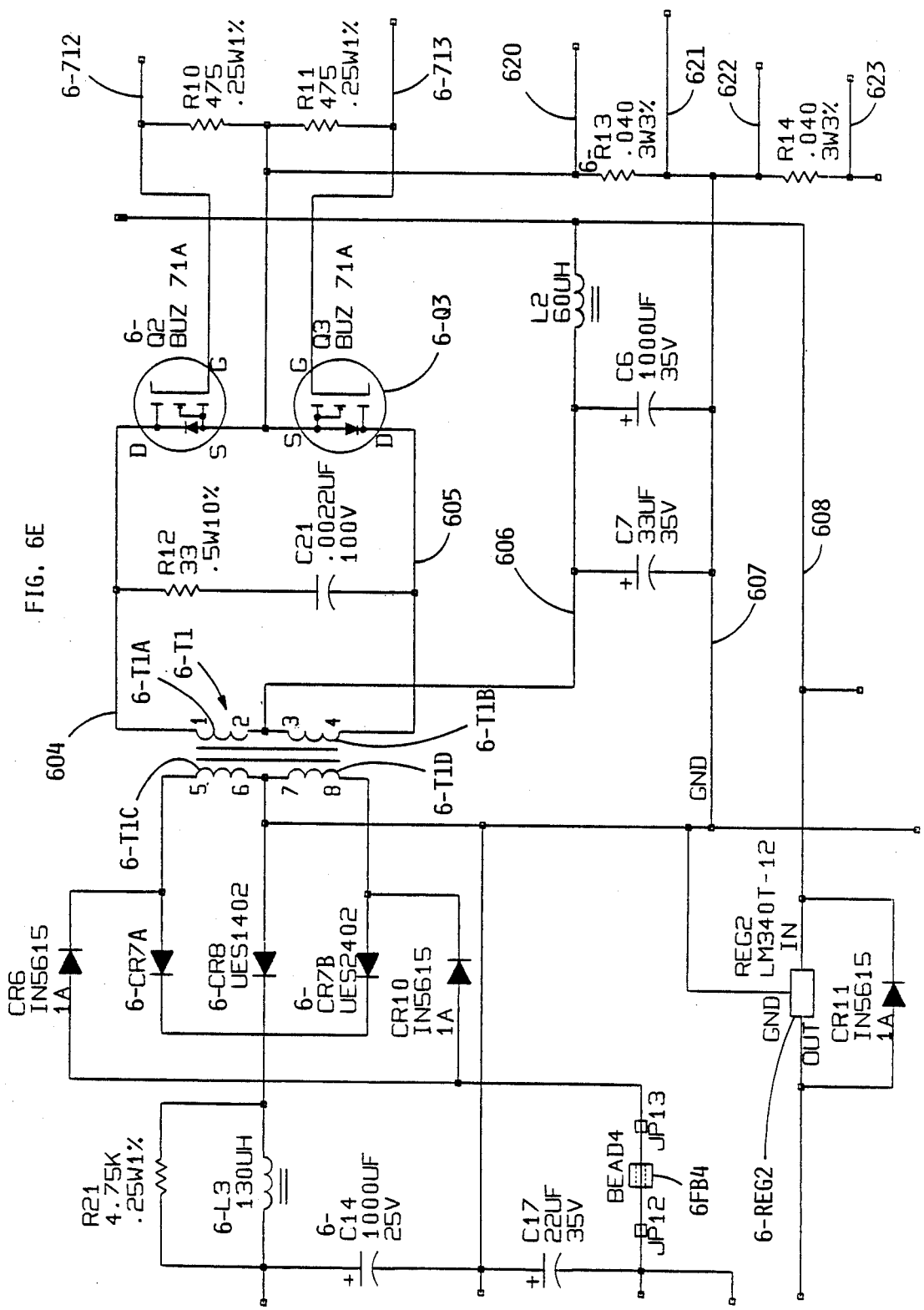
Figure 6F:
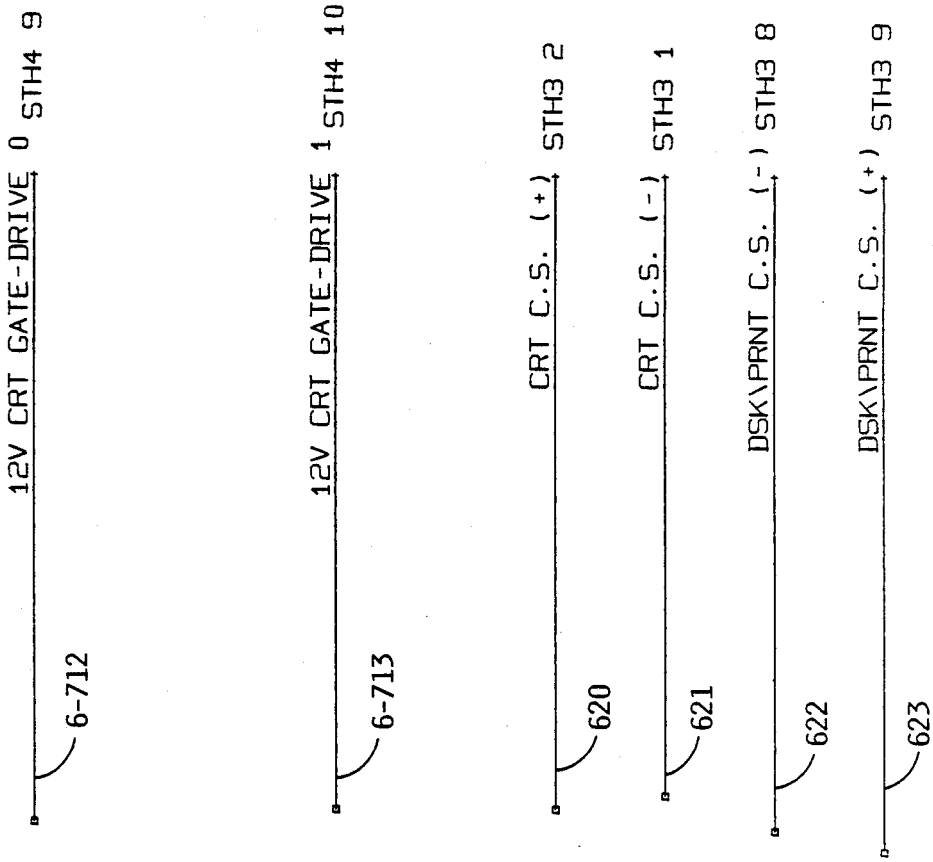
Figure 66:
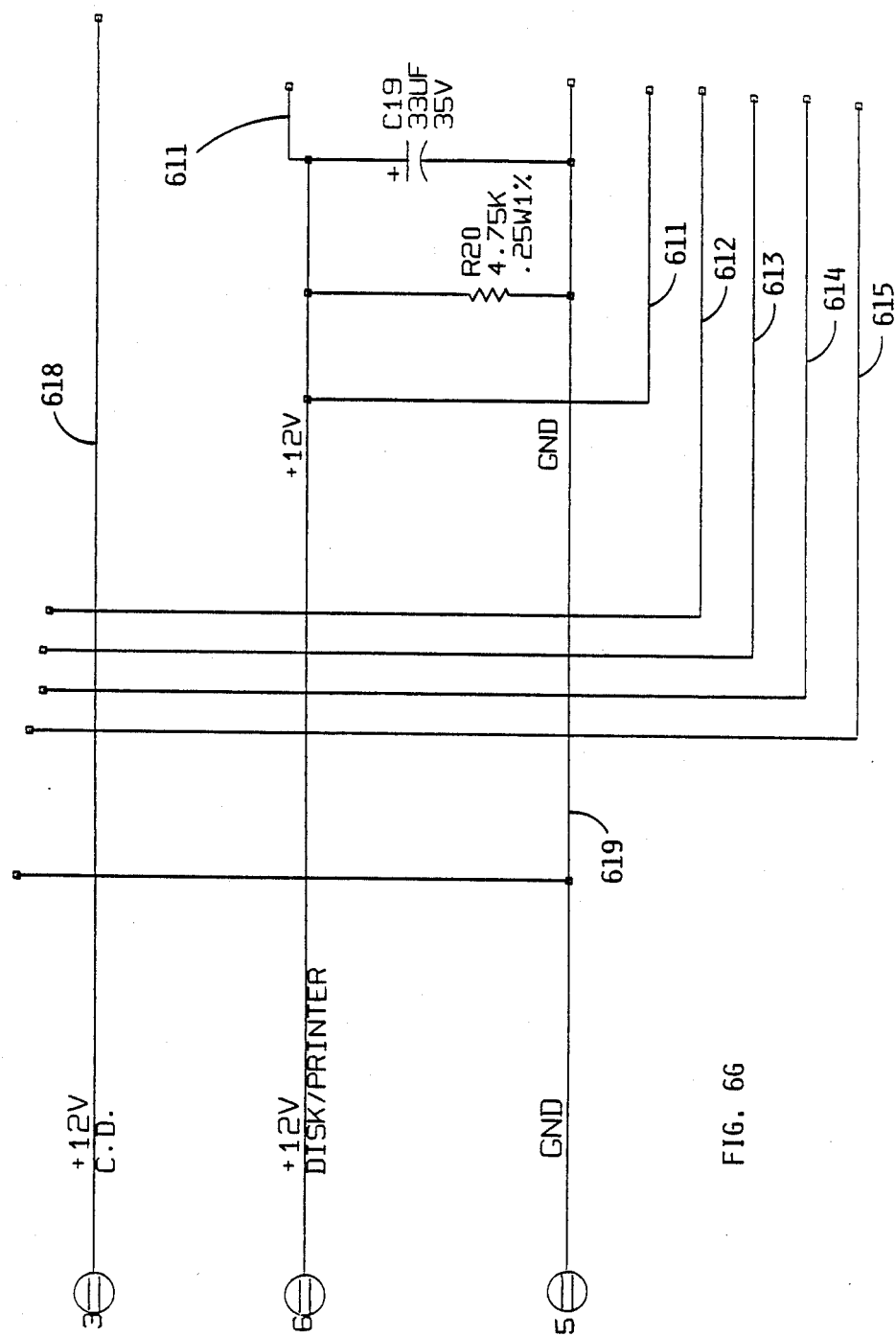
Figure 6H:
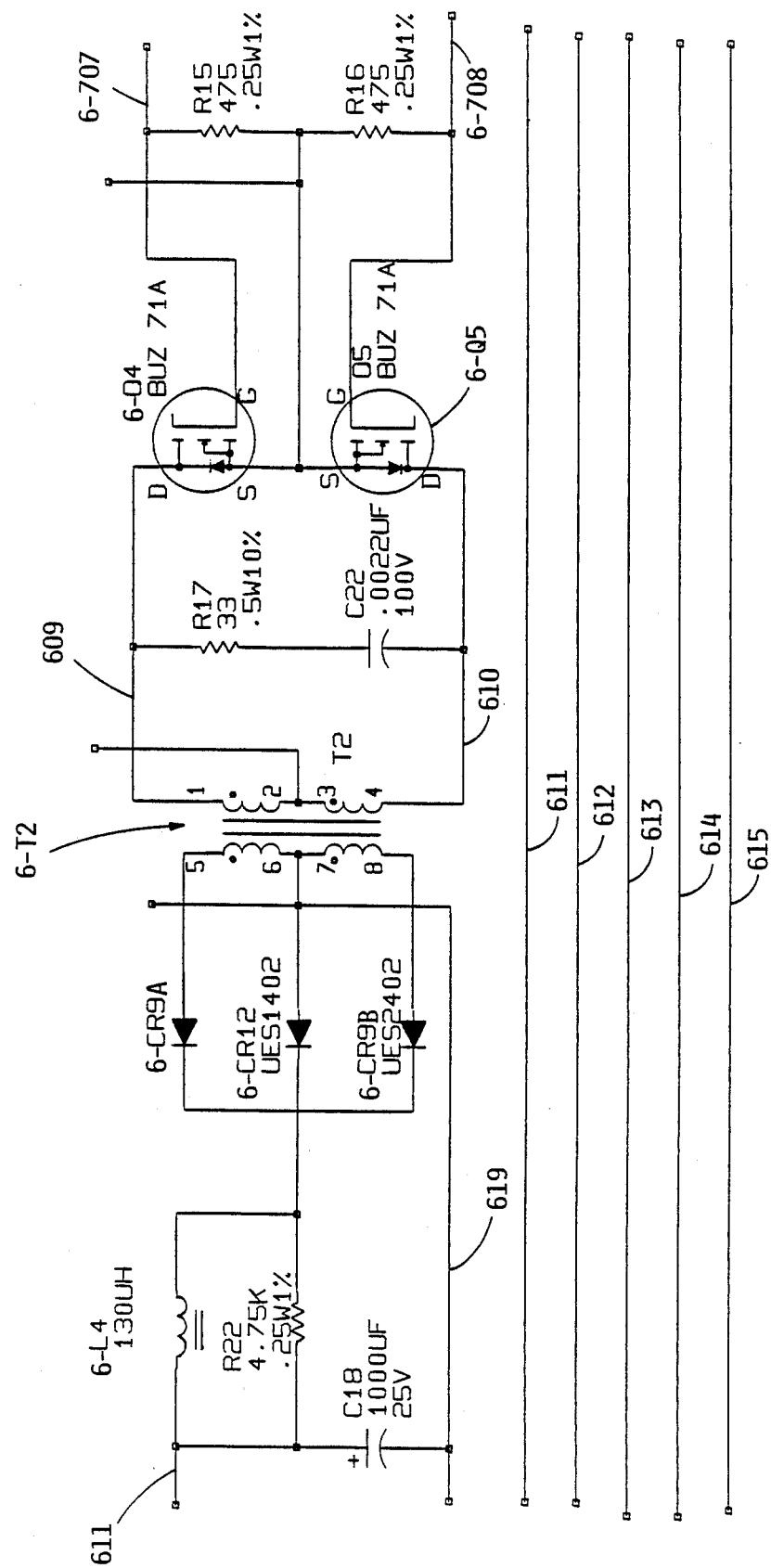
Figure 6I:
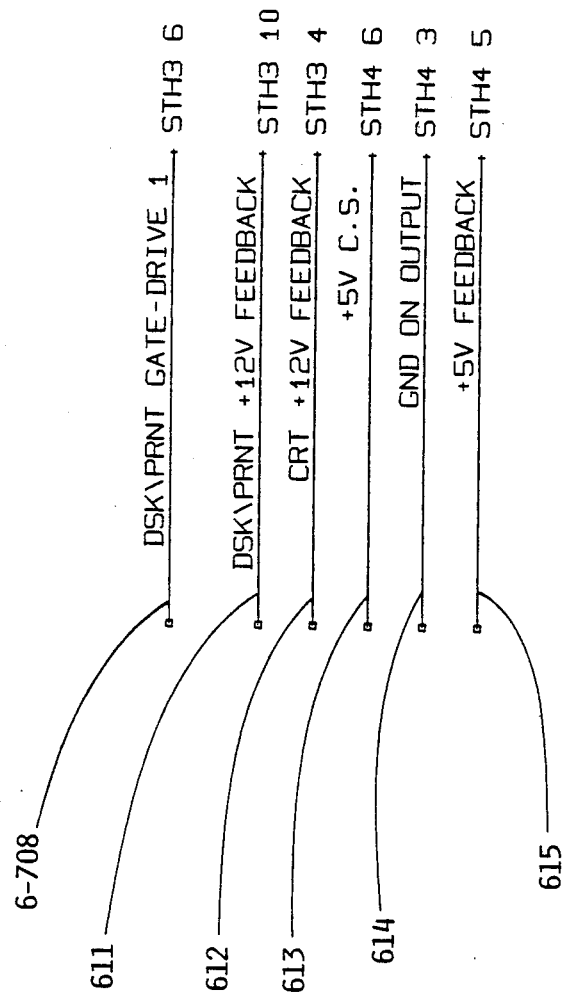

FIGS. 4A and 4B - AC/DC SECTION
FIGS. 6A and 6B - OUTPUT SECTION
Parts List, FIGS. 4A,4B,6A,6B

| Reference Designator | Description |
|---|---|
| 4-J4 | CABLE, BATTERY |
| R32 | RES, 1W 10% 33 OHMS |
| R12,17,33 | RES, ¼W 10% 33 OHMS |
| 4-R29,4-R30 | RES,1W 5% 8.2K OHMS |
| 6-R13,14 | RES,3W 3% 0.040 OHMS |
| 6-R1,R34 | RES,3W 3% 0.020 OHMS |
| R25,26 | RES,1W 5% 47K OHMS |
| 6-R8 | RES,¼W 1% 931 OHMS |
| R37 | RES,2W 3%, .5 OHMS |
| 4-R24 | THERMISTOR, 2.5NTC |
| R6 | RES, ¼W 5% 33 OHMS |
| 4-R28 | RES, ¼W 1% 22.1 OHMS |
| R4,41 | RES,¼W 1% 49.9 OHMS |
| 6-R9 | RES,¼W 1% 68.1 OHMS |
| 6-R2,R31 | RES,¼W 1% 100 OHMS |
| 4-R39 | RES,¼W 1% 243 OHMS |
| 4-R43 | RES,¼W 1% 267 OHMS |

-continued

| Reference | Description |
|---|---|
| R23 | RES,¼W 1% 365 OHMS |
| R7,10,11,15,16 | RES,¼ 1% 475 OHMS |
| 6-R3,R5 | RES,¼ 1% 1.00K OHMS |
| R19,4-R27 | RES,¼W 1% 2.21K OHMS |
| R18,20,21,22 | RES,¼W 1% 4.75K OHMS |
| 4-R38 | RES,¼W 1% 10.0 K OHMS |
| 4-R40 | RES,¼W 1% 49.9K OHMS |
| R42 | RES,¼W 5% 1.5K OHMS |
| 6-C1 | CAP,10V 20% 100UF |
| C17 | CAP, 35V 20% 22UF |
| 6-C12 | CAP, 10V 20% 47UF |
| C5,7,19,32,4-C30 | CAP, 35V 20% 33UF |
| 6-C15 | CAP, 25VDC 20% 68UF |
| C4,6 | CAP, 35V 20% 1000UF |
| C16 | CAP, 35V 20% 2.2UF |
| C26,27 | CAP, 300V 2% 2200PF**** |
| 4-C28,4-C29 | CAP, 35V 20% 470UF |
| 4-C23,4-C24 | CAP,200V 20% 470UF |
| C2,31 | CAP,1500V 20% 10000PF |
| 4-C25 | CAP,.1UF 10% 630V |
| 6-C14,18 | CAP,25V 20% 1000UF |
| 6-C9,10,11 | CAP, 10V 1000UF |
| 6-C20 | CAP, 100VDC 10%.1UF |
| 6-C13 | CAP, 50V 10% .22UF |
| C8,21,22 | CAP, 100VDC 10%.0022UF |
| C3 | CAP, 50VDC 20% 1.0UF |
| CR1,14 | DIODE .200A-1N4454 |
| 6-CR4 | ZENER, 6.2V-1N4735A |
| CR2,4-Z1,4-Z2 | ZENER,15V-1N4744A |
| 4-M0V1 | VARISTOR, 250VRMS,6KA |
| CR19,20 | DIODE 3A-1N5416 |
| 6-CR8,12 | DIODE 100V-UES1402 |
| 5-R20,30 | RES ¼W 1% 100K OHMS |
| 5-R7 | RES ¼W 1% 681K OHMS |
| 5-C1 | CAP, 35VDC 20% 10UF |
| 5-C6 | CAP, 100V 5% 1000PF NPO |
| 5-C12 | CAP, 35V 20% 4.7UF |
| 5-C2,3,4 | CAP, 50V 10% .22UF |
| 5-C5 | CAP 100VDC 10% .0022UF |
| 5-C8,10 | CAP 100VDC 10% .01UF |
| 5-C7 | CAP 50VDC 20% .47UF HT |
| 5-CR1,2,3,5,6 | DIODE, .200A-1N4454 |
| 5-U2 | VOLTAGE COMPARATOR LM 339N |
| 5-U1 | REG. PWM, 3525A |

Figure 7A:
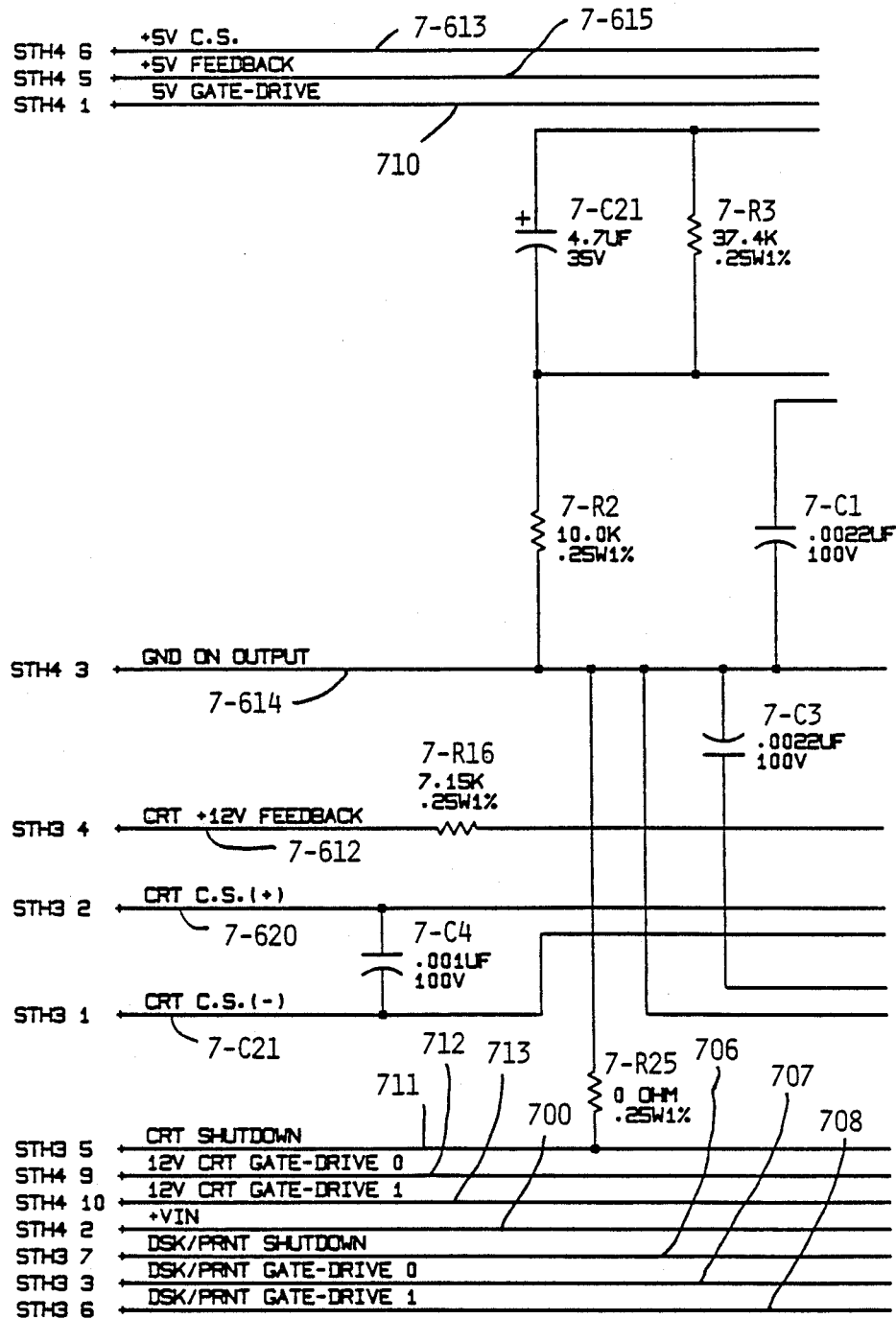
FIGS. 7A–7F show exemplary electric circuitry for the control section of the power supply of FIGS. 2B and 2C, FIG. 7B being a continuation of FIG. 7A to the right, FIG. 7C being a continuation of FIG. 7B to the right, FIG. 7D showing circuitry which appears below the circuitry of FIG. 7A, FIG. 7E being a continuation of FIG. 7D to the right and being a continuation of FIG. 7B in a downward direction, and FIG. 7F being a continuation of FIG. 7E in a rightward direction and being a continuation of FIG. 7C in a downward direction.
Figure 7B:
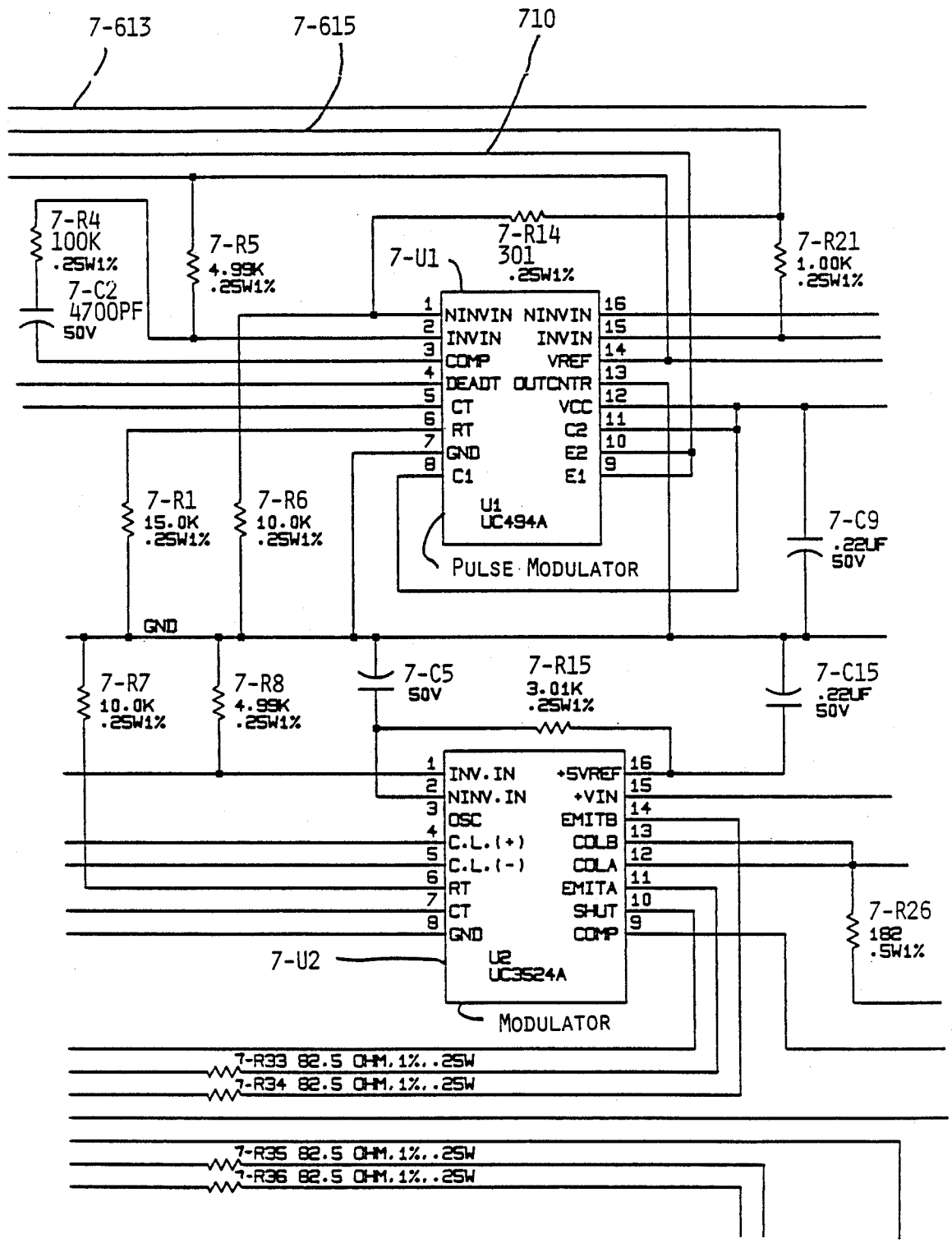
Figure 7C:
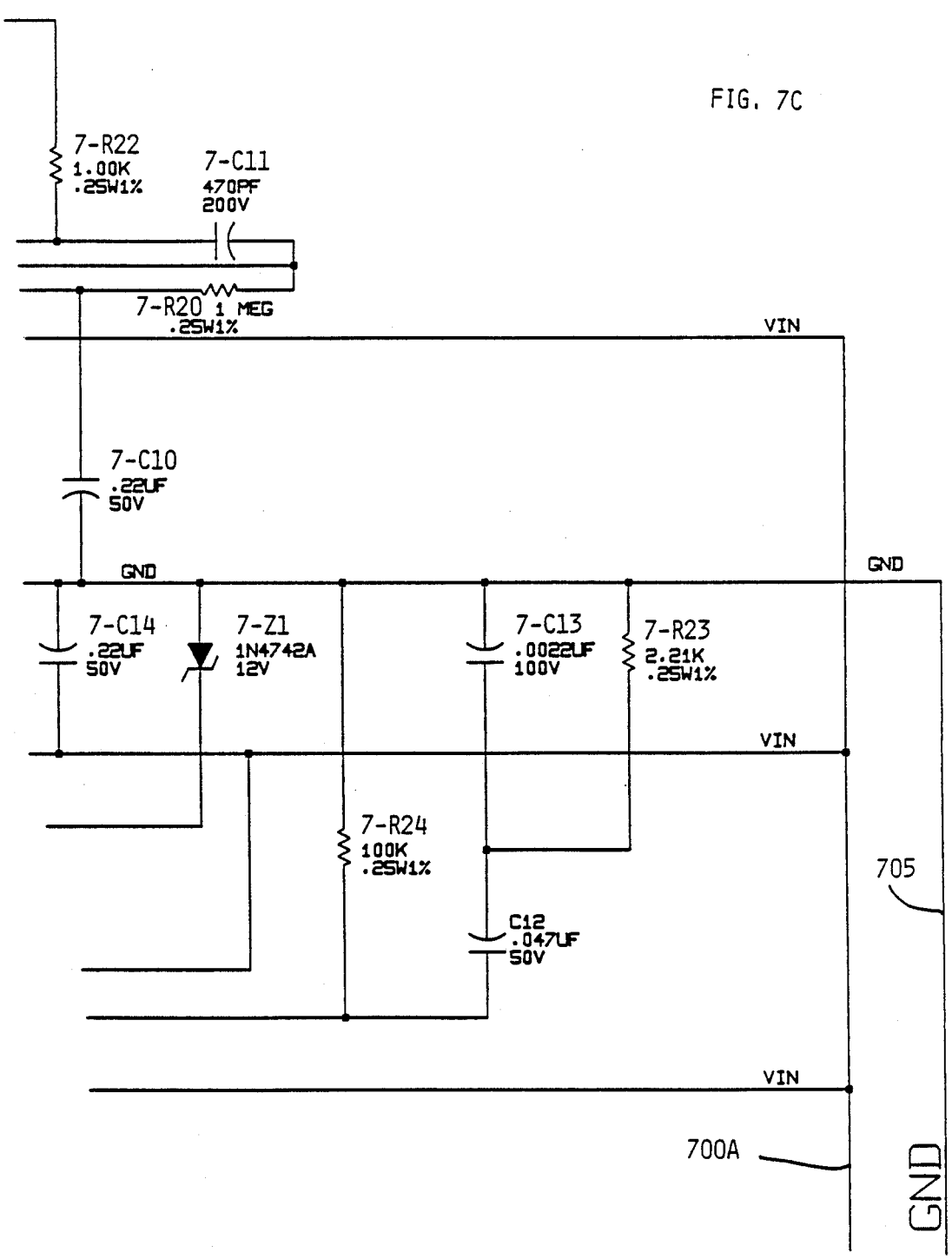
Figure 7D:
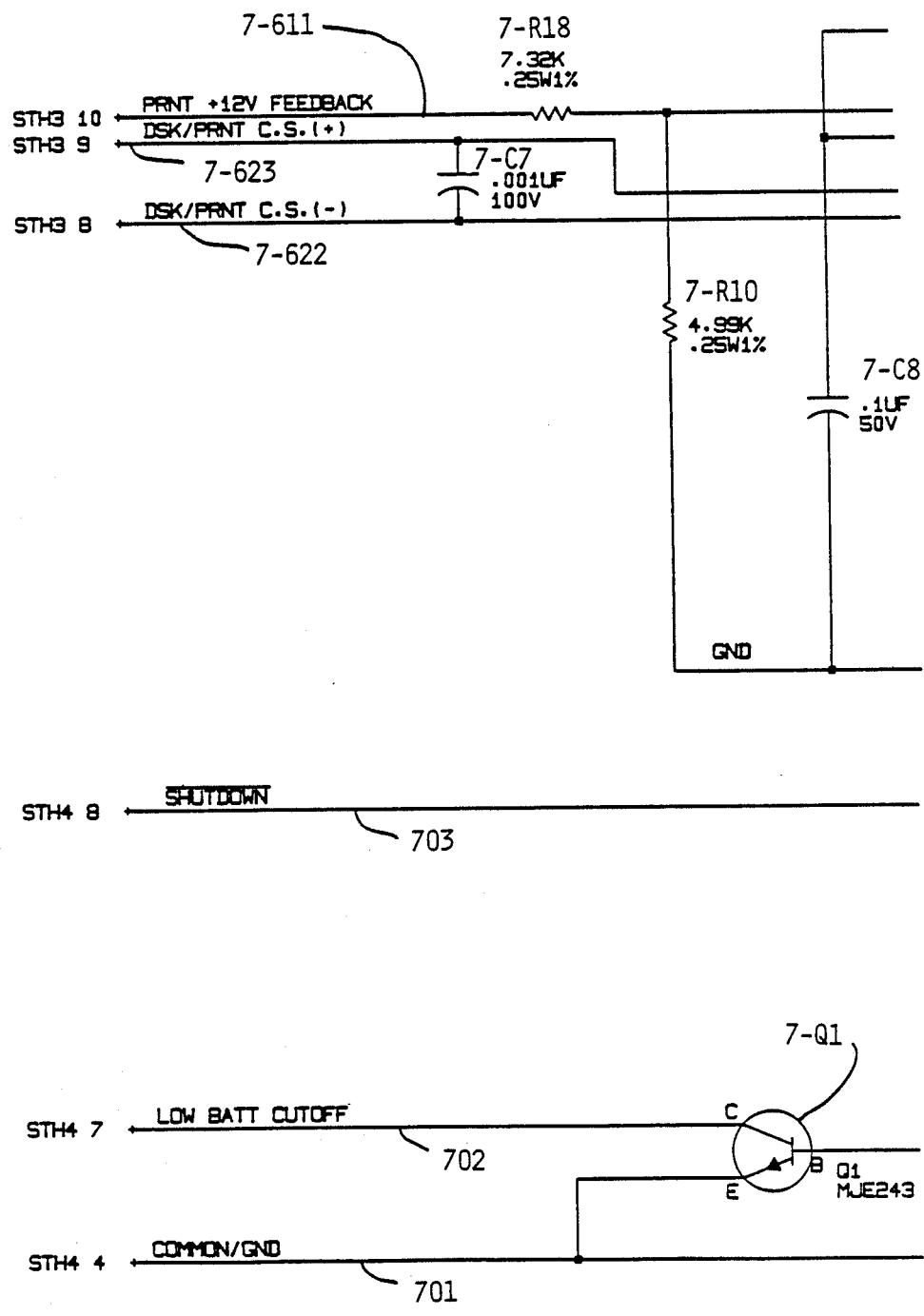
Figure 7E:
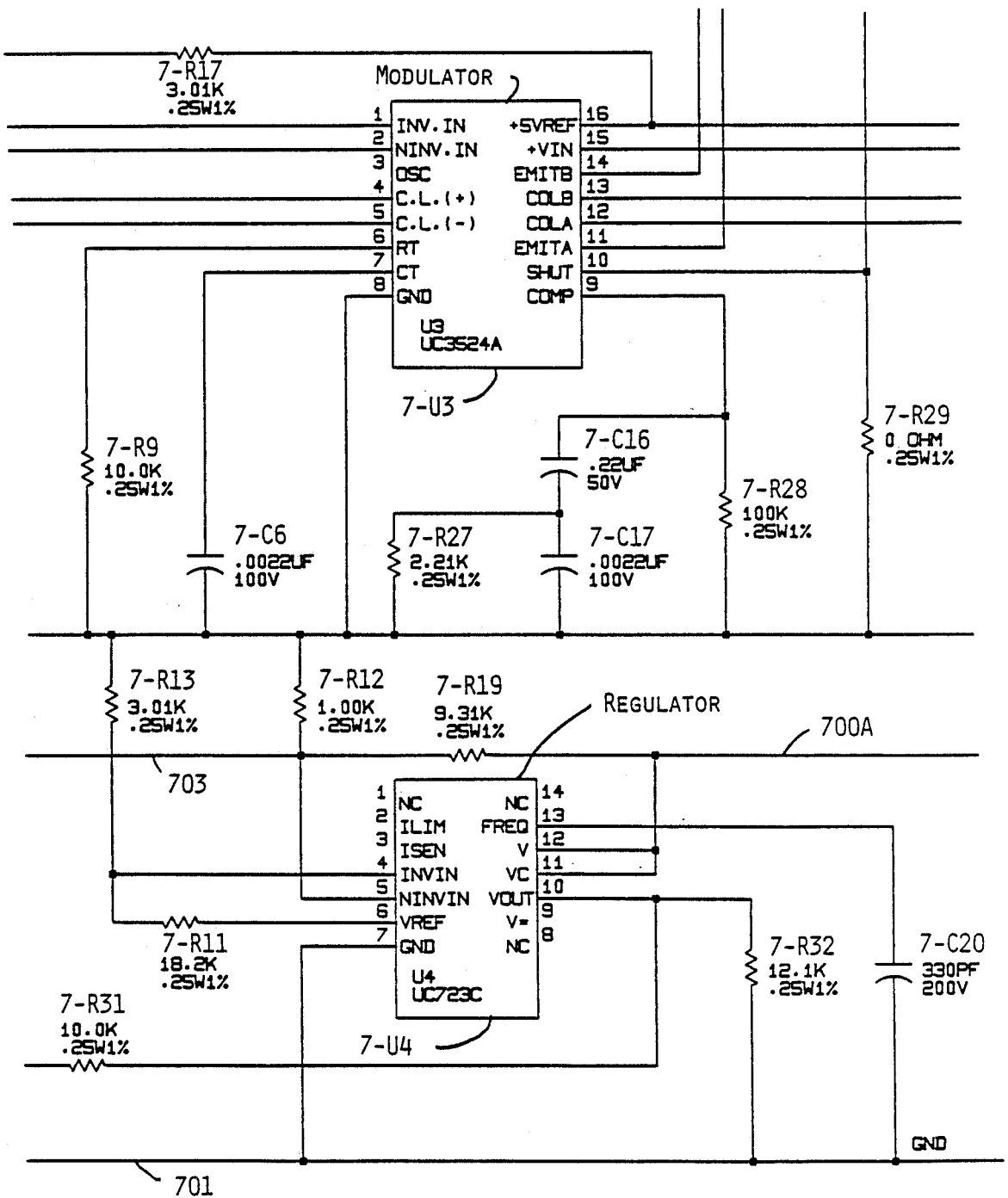
Figure 7F:
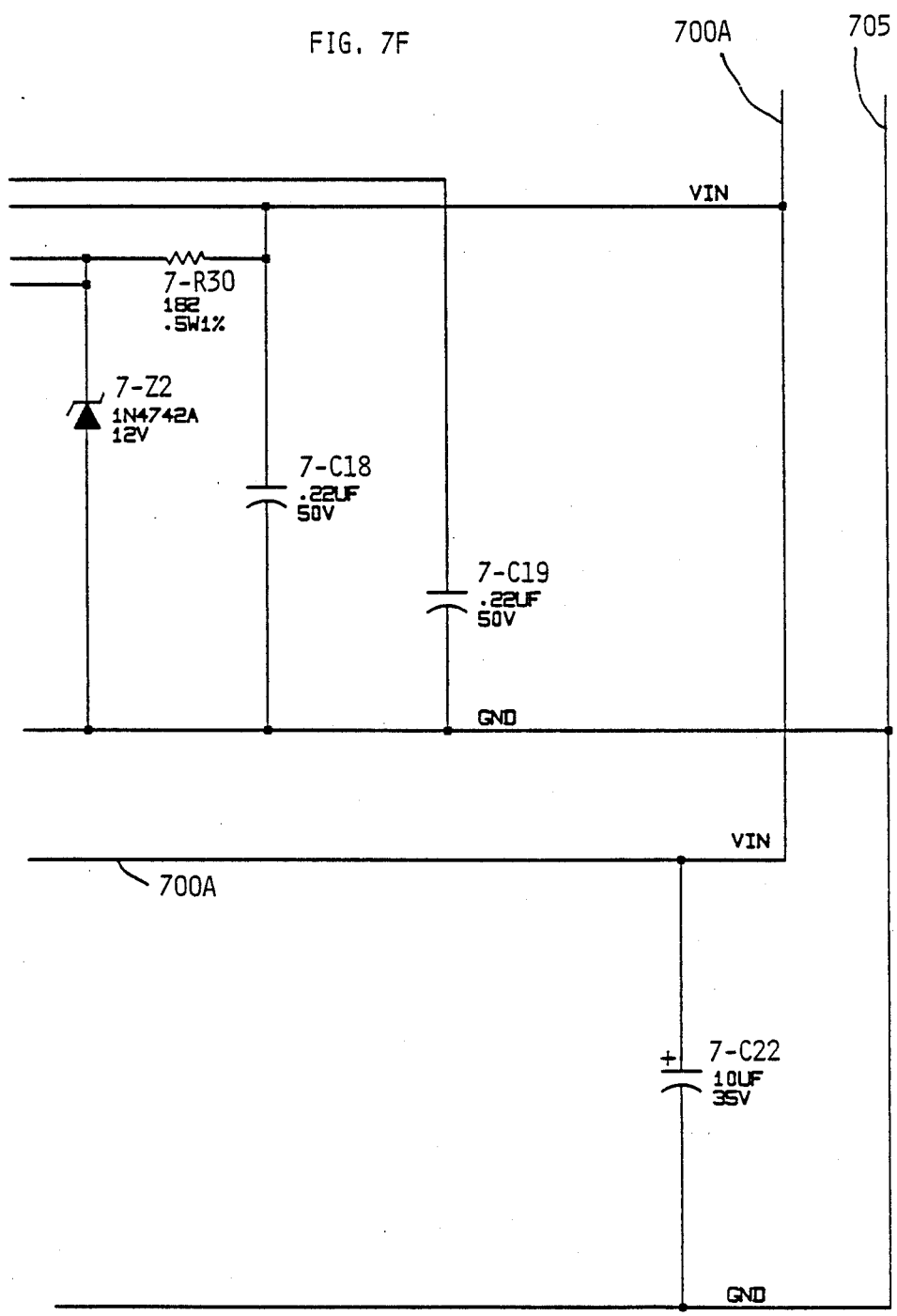

FIGS. 7A,7B CONTROL BOARD
Parts List FIGS. 7A,7B

| Reference Designator | Description |
|---|---|
| 7-R26,30 | RES, ¼W 1% 182 OHMS |
| 7-R33,34,35,36 | RES, ¼W 1% 82.5 OHMS |
| 7-R14 | RES, ¼W 1% 374 OHMS |
| 7-R12,21,22 | RES, ¼W 1% 1.00K OHMS |
| 7-R23,27 | RES, ¼W 1% 2.21K OHMS |
| 7-R13,15,17 | RES, ¼W 1% 3.01K OHMS |
| 7-R4,5,8,10 | RES, ¼W 1% 4.99K OHMS |
| 7-R18 | RES, ¼W 1% 7.32K OHMS |
| 7-R19 | RES, ¼W 1% 9.31K OHMS |
| 7-R2,6,7,9,31 | RES, ¼W 1% 10.0K OHMS |
| 7-R32 | RES, ¼W 1% 12.1K OHMS |
| 7-R1 | RES, ¼W 1% 15.0K OHMS |
| 7-R11 | RES, ¼W 1% 18.2K OHMS |
| 7-R3 | RES, ¼W 1% 37.4K OHMS |
| 7-R24,28 | RES, ¼W 1% 100K OHMS |
| 7-R20 | RES, ¼W 1% 1.00M OHMS |
| 7-R25,R29 | RES, ¼W 1% 0 OHM |
| 7-R16 | RES, ¼W 1% 7.15K OHMS |
| 7-C21 | CAP, 35V 20% 4.7UF |
| 7-C22 | CAP, 35V 20% 10UF |
| 7-C11 | CAP, 200VDC 10% 470PF |
| 7-C4,7 | CAP, 100VDC 10% .001UF |
| 7-C5,9,10,14,15, | CAP, 50V 10% .22UF |
| 7-C1,3,6,13,17 | CAP, 100VDC 10% .0022UF |
| 7-C20 | CAP, 200V 10% 330PF |
| 7-C2 | CAP, 50VDC 10% .047UF |
| 7-C8 | CAP, 50VDC 10% .1UF |
| 7-C12 | CAP,50VDC 10% .047UF NPO |
| 7-Z1,2 | ZENER, 12V-1N4742A |
| 7-Q1 | XSTR NPN 4 AMP-MJE243 |
| 7-U4 | REGULATOR, UA723CN |
| 7-U2,7-U3 | MODULATOR, UC3524A |

-continued

| Reference | Description |
|---|---|
| 7-U1 | PULSE MOD, UC494AC |

In a presently preferred control board, resistor 7-R-4, FIG. 7B, has a value of one hundred kilohms, resistor 7-R14, FIG. 7B, has a value of 301 ohms, and capacitor 7-C2, FIG. 7B, has a value of 4700 picofarads.

INTERCONNECTIONS BETWEEN
FIGS. 3,4A,4B, 5,6A,6B,7A AND 7B

The following tabulation gives exemplary interconnections between the drawing figures as indicated, (reference designations starting with a numeral corresponding to the relevant drawing figure):

| Reference Designation | Reference Designation | Label |
|---|---|---|
| 301 | 4-JP11 | +VIN AUX REG. BOARD |
| 302 | 4-JP14 | COMMON |
| 303 | 4-J2-2 | LINE |
| 304 | 4-J2-1 | NEUTRAL |
| 400(FIG. 4A) | 400(FIG. 4B) | DRIVE 0 |
| 401(FIG. 4A) | 401(FIG. 4B) | DRIVE 1 |
| 402(FIG. 4A) | 402(FIG. 4B) | OUTPUT VOLTAGE TERMINAL |
| 403(FIG. 4A) | 403(FIG. 4B) | RESISTIVE CURRENT SENSE |
| 404(FIG. 4A) | 404(FIG. 4B) | GROUND ON OUTPUT |
| 405(FIG. 4A) | 405(FIG. 4B) | FET MAIN CURRENT SENSE |
| 406(FIG. 4A) | 406(FIG. 4B) | 17VDC |
| 407(FIG. 4A) | 407(FIG. 4B) | $\overline{\text{ACFL}}$ |
| 408(FIG. 4A) | 408(FIG. 4B) | DC POWER |
| 409(FIG. 4A) | 409(FIG. 4B) | GND |
| 410(FIG. 4A) | 410(FIG. 4B) | 14.10VDC |
| 400(FIG. 4B) | 5-400 | DRIVE 0 |
| 401(FIG. 4B) | 5-401 | DRIVE 1 |
| 402(FIG. 4B) | 4-402 | OUTPUT VOLTAGE TERMINAL |
| 403(FIG. 4B) | 5-403 | RESISTIVE CURRENT SENSE |
| 404(FIG. 4B) | 4-404 | GROUND ON OUTPUT |
| 405(FIG. 4B) | 5-405 | FET MAIN CURRENT SENSE |
| 407(FIG. 4B) | 6-407 | $\overline{\text{ACFL}}$ |
| 408(FIG. 4B) | 6-408 | DC POWER |
| 409(FIG. 4B) | 6-409 | HIGH POWER GND |
| 4STH1-1(FIG. 4B) | 501 | +VIN |
| 4STH1-2(FIG. 4B) | 502 | COMMON |
| 4STH4-2(FIG. 4B) | 700 | +VIN |
| 4STH4-4(FIG. 4B) | 701 | COMMON/GND |
| 4STH4-7(FIG. 4B) | 702 | LOW BATT CUTOFF |
| 4STH4-8(FIG. 4B) | 703 | $\overline{\text{SHUT DOWN}}$ |
| 6-710 | 710 | +5V GATE-DRIVE |
| 6-712 | 712 | 12VCRT GATE-DRIVE 0 |
| 6-713 | 713 | 12VCRT GATE-DRIVE 1 |
| 620 | 7-620 | CRT C.S. (+) |
| 621 | 7-621 | CRT C.S. (−) |
| 622 | 7-622 | DSK/PRNT C.S. (−) |
| 623 | 7-623 | DSK/PRNT C.S. (+) |
| 6-707 | 707 | DSK/PRNT GATE-DRIVE 0 |
| 6-708 | 708 | DSK/PRNT GATE-DRIVE 1 |
| 611 | 7-611 | DSK/PRNT +12V FEEDBACK |
| 612 | 7-612 | CRT +12V FEEDBACK |
| 613 | 7-613 | +5V C.S. |
| 614 | 7-614 | GND ON OUTPUT |
| 615 | 7-615 | +5V FEEDBACK |

Figure 9:
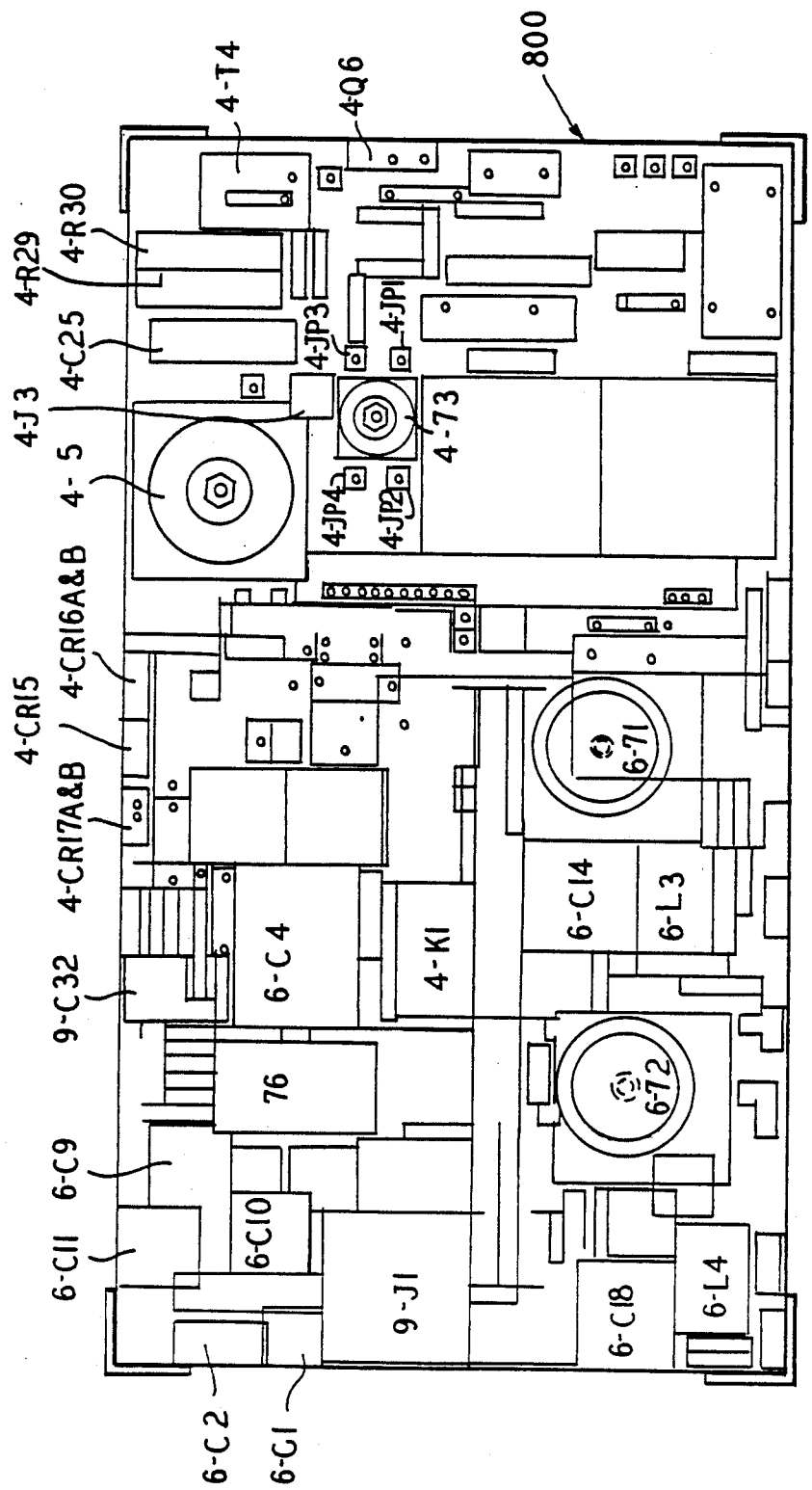
FIG. 9 is a somewhat diagramatic plan view showing the layout of parts for the power supply unit of FIG. 8.

| Reference designation | Position of Output Connector J1; (see FIG. 9) | Label |
|---|---|---|
| 6-407 | J1-7 | $\overline{\text{ACFL}}$ |
| 615 | J1-1 | NUC +5V |
| 614 | J1-2 | GND |
| 612 | J1-9 | CRT +12VDC 2.5A |

-continued

| INTERCONNECTIONS BETWEEN FIGS. 3,4A,4B, 5,6A,6B,7A AND 7B |||
|---|---|---|
| The following tabulation gives exemplary interconnections between the drawing figures as indicated, (reference designations starting with a numeral corresponding to the relevant drawing figure): |||
| 616 | J1-4 | GND |
| 617 | J1-8 | −12V MODEM |
| 618 | J1-3 | +12V C.D. |
| 611 | J1-6 | +12V DISK/PRINTER |
| 619 | J1-5 | GND |

The transformer 4-T5 may be a forty volt (no load) output transformer of pot core construction for printed circuit board mounting. The characteristics of the transformer may be summarized as follows:

Characteristics of Power Transformer 4-T5

Electrical
Nominal voltage (r.m.s.)
Primary winding 4-T5A—120 volts
Secondary winding 4-T5B—40 volts (no load) 14 volts, loaded
Auxiliary winding 4-T5C 8 volts (no load)
Turns ratio: three to one
Maximum operating temperature: 130° C.
Primary inductance 7.5 millihenries (windings 4-T5B and 4-T5C open)
Dielectric withstand: 1500 volts for one minute, (UL 478 applications)
Magnetics
Magnetic path length: 1.78 inches
Core constant: 8.3 per inch
Effective core area: 0.214 square inch
Effective core volume: 0.376 cubic inch
Bobbin winding area: 0.091 square inch
Mean length of turn on bobbin: 2.40 inches
Inductance index (per pair of cores):
  8300 millihenries per 1000 turns, plus or minus twenty-five percent
Effective permeability (per pair of cores): 2180
Maximum leakage indutance: ten microhenries with secondary shorted, at one volt and one kilohertz
Materials
Pot core: manganese-zinc ferrite, Ferroxcube part no. 3019PL00-3C8
Bobbin: Delrin, Ferroxcube part no. 3019F1D
Bobbin rating: 130° C. (IEEE), UL 94 V-HB flame rating
Primary coil 4-T5A: solid copper, #22 AWG, Phelps Dodge Magnet Wire Co. Thermaleze or Armoured Polythermaleze 2000, closely wound on bobbin first, two layers, thirty turns, sleeved leads
Secondary coil 4-T5B: #18 AWG, Phelps Dodge Magnet Wire Co., heavy Nylese, closely wound, one layer, ten turns
Auxiliary coil 4-T5C: #24 A.W.G., Phelps Dodge Magnet Wire Co., Nylese, two turns
Sleeving: primary and secondary winding leads, Teflon, exteding 0.375 inch from core edge. Auxiliary winding leads, Teflon, extending 0.500 inch from pot core.
Shield: copper foil terminated with stranded #20 AWG (minimum) PVC insulated wire.
Insulation: Nylon, Nomex or 3M electrical tape, UL class B insulation material
Finish: vacuum impregnation, 3M Scotchcast #280 epoxy resin.

Construction:

Primary coil 4-T5A: First (inside) winding, thirty turns close wound in two layers (evenly wound without overlapping, no interlayer insulation)
Primary insulation: As required for coil surface and crossover electrical and mechanical securement.
Shield: One turn of copper foil, over insulation and primary with insulation material between the overlapped ends so as to prevent shorted turn.
Ground wire: Solder bonded to the foil shield and routed out with primary leads.
Insulation: Tape as required for shield electrical and mechanical securement.
Second coil 4-T5B: Second (middle) winding, ten turns, evenly wound over shield insulation layer (leads to exit opposite primary)
Secondary insulation: As required for coil surface and mechanical securement.
Auxiliary coil 4-T5C Third (outside) winding, two turns, wound over secondary insulation layer (leads to exit with secondary leads and extend beyond them).
Outer insulation: Tape as required to provide insulation to pot core and mechanical securement.
Core assembly: Core halves to be mechanically secured together by means of adhesive cement bead on core exterior at mating area.
Finish: Vacuum impregnation
Bobbin: 1.181 plus or minus 0.020 inch outside diameter 0.169 plus or minus 0.024 inch center hole 0.740 plus or minus 0.008 inch height dimension 0.217 plus or minus 0.004 inch diameter clear of varnish at top center of bobbin for 1/16 inch diameter nylon mounting screw Discussion of Exemplary Operation of the Circuit of FIGS. 3, 4A, 4B, 5, 6A, 6B, 7A and 7B In a specific embodiment in accordance with FIG. 1 which has been successfully operated and which is shown in detail in FIGS. 2A, 2B, 2C and 3 through 12, the volt-second product for convertor stage 11 remained at about six hundred and forty volt-microseconds for peak input voltages between about one hundred and thirteen volts (corresponding to an AC line voltage of about ninety volts r.m.s. and a ripple voltage peak of fifteen volts, and about three hundred and thirty volts (corresponding to an AC line voltage of about two hundred and fifty volts, and a ripple voltage peak of fifteen volts). In this example, the operating frequency at the power transformer of convertor stage 11 was eighty-eight kilohertz corresponding to an operating time period per cycle of about 11.4 microseconds. At the low line voltage of ninety volts, the duty cycle of the rectangular waveform current pulse in the primary circuit approaches fifty percent or about 5.7 microseconds. The minimum duty cycle is approximately equal to the product of the maximum duty cycle of fifty percent and the ratio of the minimum peak input voltage (113 VDC) to the maximum peak input voltage (330 VDC) or about seventeen percent, i.e. a pulse duration per cycle of about 1.9 microseconds.

The following shows the calculation of BMAX for power transformer 4-T5, FIG. 4A, for the case of a low line input value (90 VAC) and for the case of a high line input value (250 VAC), and demonstrates that the value BMAX is essentially the same at low and high input values. BMAX is representative of the peak working flux density. (BMAX is not related to the saturation flux density of the core material of the power transformer 4-T5, which has a saturation flux density of about 3300 gauss at one hundred degrees Celsius.)

Calculation of BMAX for the Power Transformer of the AC to DC Forward convertor, FIG. 4A, for Minimum and Maximum Input Line Voltages $$BMAX = \frac{EPK \cdot T \cdot 10^8}{NA}$$

Where EPK=(AC Line Voltage multiplied by 1.414)—(Ripple Voltage),
t is the "on" time of the convertor primary current waveform in seconds,
N is the number of turns of primary winding 4-T5A, (i.e. thirty)
A is the effective cross sectional area in centimeters squared, (i.e. 1.38 cm²)
Case I (90 VAC Input)

$$EPK = (90 \cdot 1.414) - 15 = 113 \ VDC$$

Frequency of oscillation is 88 kHz
Period = 1/Frequency = 1/88,000 = 11.36 microseconds
At low line, duty cycle approaches fifty percent, so that $$t(min) = .5 \cdot 11.36 = 5.68 \text{ microseconds}$$

$$\text{thus, } BMAX = \frac{113 \cdot 5.68 \cdot 10^{-6} \cdot 10^8}{(30) \cdot (1.38)}$$

$$BMAX = 1550 \text{ gauss}$$

Case II (250 VAC Input)

$$EPK = (250 \cdot 1.414) - 15 = 330 \ VDC$$

Where the maximum duty cycle, DMAX is 0.50, the minimum duty cycle DMIN which occurs at high AC line, is equal to the maximum duty cycle DMAX, (0.5), times the ratio of minimum DC input voltage (113 VDC) to maximum DC input voltage (330 VDC); thus $$DMIN = .50 \frac{113 VDC}{330 VDC} = .17$$

The "off" time of the convertor waveform is 9.43 microseconds, and the "on" time is 0.17 times 11.36 microseconds, or 1.93 microseconds, and thus, $$BMAX = \frac{330 \cdot 1.93 \cdot 10^{-6} \cdot 10^8}{(30) \cdot (1.38)}$$

$$BMAX = 1540 \text{ gauss}$$

OPERATION OF FORWARD CONVERTOR STAGE NO. 1

The first conversion stage FIG. 4A is an AC to DC forward convertor which steps down the AC line voltage to 14.8 VDC. The remaining stages operate directly from the 14.8 VDC lines 408 and 409, FIG. 4B. The standby battery indicated at 17 in FIG. 1 is coupled into the system at 4-J4, FIG. 4B, via relay 4-K1. The power stages following the first stage of FIGS. 4A and 4B provide voltage regulation through pulse width modulation, allowing operation of these stages from the standby battery so as to afford complete protection against power failure.

During AC line operation, a typical efficiency of the system is 78%. Power loss is mainly due to dual conversion. During battery operation, conversion Stages No. 2, 3, & 4 transform the battery voltage directly to the load, increasing efficiency to between 83% and 85%. This technique ultimately results in using the next smaller size of standby battery.

The first stage of FIGS. 4A & 4B supplies plus 14.8 volts DC at up to fifteen amperes peak. The power supply AC line input is protected by fuse 4-F2, FIG. 4A (at the lower left), varistor 4-MOV1 and thermistor 4-R24 which form an input protection network.

The fuse 4-F2 protects the input wiring to the power supply. The varistor 4-MOV1 clamps incoming line transients whose rise time has been damped by choke 4-T7. The AC line voltage is rectified by a bridge rectifier 4-BRD1 which charges capacitors 4-C23 and 4-C24 to approximately 155 VDC. During initial power up, 4-C23 and 4-C24 are completely discharged.

Thermistor R24 limits in-rush current until 4-C23 and 4-C24 have been charged. After one to two seconds, the relatively high resistance of 4-R24 decreases substantially, reducing its power dissipation to a negligible value. Energy stored in 4-C23 and 4-C24 is switched through the primary winding 4-T5A of transformer 4-T5 by transistor 4-Q6. The switching frequency of 4-Q6 is greater than eighty kilohertz, and is more than twice the frequency of the second and third conversion stages. The higher than usual operating frequency which is at least in the forty kilohertz range is a principal advantage in the embodiment. The reduction of magnetic size is a key element which is extremely advantageous, for example, in order to enable the entire system of FIG. 1 to occupy a small area on a counter or the like. The switching frequency was refined after the number of turns for two complete close wound layers on the pot core of transformer 4-T5 was known.

Under normal operating conditions, transformer 4-T5 operates at 0.16 Tesla. With relatively high line voltage, transformer 4-T5 may operate at 0.255 Tesla. With transistor 4-Q6 in conductive mode, energy is transferred from the primary winding 4-T5A to the secondary winding 4-T5B, forward biasing diodes 4-CR16A and 4-CR16B, and the charging capacitors 4-C28, 4-C29, and 4-C30 through choke 4-L6 and at the same time supplying energy to the load. When transistor 4-Q6 switches off, diodes 4-CR16A and 4-CR16B are reversed bias. Diode 4-CR15 allows energy, previously stored in 4-L6 and smoothed by 4-C28, 4-C29, and 4-C30 to discharge through the load. Before transistor 4-Q6 can initiate its next turn-on sequence, the magnetic core of transformer 4-T5 must be reset. A clamp winding, associated with classical forward convertor design, has been eliminated in the illustrated embodiment to simplify construction of transformer 4-T5. In its place is a dissipative reset circuit comprised of 4-CR13, 4-C25, 4-R29, and 4-R30. When 4-Q6 switches off, 4-C25 charges through 4-CR13 to an essentially steady state voltage which is sufficient for transformer reset. When 4-Q6 switches on, 4-CR13 is reversed biased, and 4-R29 and 4-R30 provide a discharge path for discharging 4-C25 before each new cycle. This process effectively resets 4-T5 preventing transformer core saturation. The total power dissipation of this reset scheme is about three percent of the output power supplied by transformer 4-T5.

Isolation transformer 4-T3, FIG. 4A, drives 4-Q6 on and off. Resistor 4-R28 slows the rise time of 4-Q6, preventing gate oscillations. During turn off of 4-Q6, resistor 4-R27 provides a discharge path for gate capacitance, enabling fast turn off of transistor 4-Q6. Zener diodes 4-Z1 and 4-Z2 limit the peak gate drive voltage to fifteen volts. The unilateral arrangement is necessary since transformer 4-T3 is driven directly by a totem pole arrangement of source transistors. These transistor drivers are internal to pulse with modulation chip 5-U1, FIG. 5. Automatic reset occurs during dead time, when both ends of the primary 4-T3A are switched to ground potential. The maximum conduction period of 4-T5 is fifty percent of the total cycle time. An "on" time greater than fifty percent is not allowed because in this case there would be insufficient time for reset of 4-T5 during the off time. The on time decreases as the line voltage increases under the action of a voltage feedback loop including line 402, FIGS. 4A and 4B, and line 5-402, FIG. 5. The voltage feedback loop maintains output voltage regulation through pulse width modulation. The pulse width modulator and current limiting circuitry are located on a separate control board, FIG. 5, which may be tested separately and then permanently attached to the main power supply printed circuit board by means of the connectors indicated at the lower left in FIG. 4B. The control board of FIG. 5 requires plus twelve volts which is supplied by an auxiliary regulator 3-REG1, FIG. 3. The auxiliary regulator 3-REG1 is driven by 3-T1 via 3-CR1, 3-CR2, and 3-C1. Transformer 3-T1 provides isolation from the Ac line.

The output voltage of the forward convertor feeds onehalf of Schottky isolation diode 4-CR17A. A DC voltage of 14.8 volts is applied to the cathode of 4-CR17A and provides operating potential for both the plus five volt switching regulator stage No. 4 and the plus twelve volt push-pull convertor stages No. 2 and 3. The DC voltage at the conversion stage input filters is 14.43 volts as a result of a 0.37 volt forward voltage drop across 4-CR17A. This voltage reverse biases 4-CR17B when AC line power is present. Diode 4-CR17B thus prevents current flow of the output of the forward convertor through the battery charging circuitry associated with line 410, FIGS. 4A and 4B.

During a complete or partial interruption of AC line power, diode 4-CR17B becomes forward bias, facilitating the parallel connection of the standby battery across the input of the second, third, and fourth conversion stages. This transfer occurs instaneously sustaining operation of the console. During this time, 4-CR17A becomes reversed bias, preventing battery current flow into the forward convertor circuit.

OPERATION OF SWITCHING REGULATOR STAGES NO. 2 AND NO. 3

Switching regulator Stage No. 2 is comprised of power transistors 6-Q2 and 6-Q3, FIG. 6A, and transformer 6-T1, FIG. 6B. This stage provides twelve volts at 2.5 amperes. Integrated circuit 7-U2, FIG. 7A, contains an internal plus five volt DC (plus or minus one percent) reference, and provides pulse width modulation, output short circuit protection and gate drive signals (at 6-712 and 6-713, FIG. 6A) for power MOSFET's 6-Q2 and 6-Q3.

Bifilar primary windings 6-T1A and 6-T1B of transformer 6-T1, FIG. 6B, are driven one hundred and eighty degrees out of phase by NPN transistor output stages of integrated circuit 7-U2. As 6-Q2 and 6-Q3 alternately saturate, the bifilar secondary transformer windings 6-T1C and 6-T1D generate high frequency alternating current. The induced voltage in the secondary is a function of the turns ratio. The alternating current is rectified by 6-CR7A and 6-CR7B, FIG. 6B, whose cathodes are common and directly feed critical inductor 6-L3, capacitors 6-C14 and 6-C15, and the load. To prevent 6-Q2 and 6-Q3 from simultaneous conduction, a five microsecond dead time period has been incorporated between each half cycle. During the dead time period, neither 6-CR7A nor 6-CR7B is forward bias, and the regulator now operates as a forward convertor. The energy stored in choke 6-L3, FIG. 6B, flows through the load by forward biasing of 6-CR8. Rectifier 6-CR8 has a lower forward voltage drop than 6-CR7A and 6-CR7B, and does not have a secondary transformer winding in series with ground. A feedback loop comprised of conductor of 7-612, FIG. 7A, resistor 7-R16 and resistor 7-R8 determines the output voltage which may be set between 11.88 and 12.12 volts. When 7-R8 remains at a constant value of 4.99 kilohms, the output voltage is merely the sum of the resistor values of 7-R16 and 7-R8. For example, when 7-R8 is 4.99 kilohms and 7-R16 is 7.15 kilohms, the output voltage is 12.10 volts. Resistor 7-R8 being 4.99 kilohms has a relatively low value of resistance. This prevents moisture from having a noticeable effect on the output voltage since the ratio of the feedback resistors is not adversely changed. Resistor 7-R7 and capacitor 7-C3 set the oscillator frequency for integrated circuit 7-U2 at just under thirty kilohertz. Resistor 7-R24 decreases the gain of the error amplifier of integrated circuit 7-U2, making the regulator more stable over the desired operating temperature range; while 7-C12, 7-C13, 7-R23 further stabilize the regulator over the entire input voltage range.

Minus twelve volts DC at one hundred milliamperes is generated at output line 617, FIG. 6B, from regulator 6-REG1. Components 6-T1, 6-CR6, 6-CR10 charge capacitor 6-C17 which delivers seventeen volts DC input to regulator 6-REG1. Current limiting of this output is a function of the three terminal regulator 6-REG1.

Output current is limited between one hundred and ten percent and one hundred forty percent overload. Output current is sensed using a resistor 6-R13, FIG. 6A, having a low resistance value and arranged in series with 6-Q2 and 6-Q3 source leads and ground. When two hundred millivolts is dropped across 6-R13, the current limiting amplifier begins overriding the error amplifier, reducing the duty cycle of 6-Q2 and 6-Q3. This current sense method may be used since the output current is directly proportional to the amount of current which can be switched through the primary winding of transformer 6-T1 by 6-Q2 and 6-Q3. Care must be taken to set the resistance value of 6-R13 so as to keep high-peak currents generated by the cathode ray tube of display 21, FIG. 1, from triggering the current limiter prematurely. When an output overload condition exists, the "on" time of 6-Q2 and 6-Q3 is approximately one microsecond, and the dead time becomes relatively long (fifteen microseconds). Choke 6-L3 saturates causing a relatively high current to flow through 6-CR8. For this reason, 6-CR8 has been mounted to the power supply case for adequate cooling. To reduce the peak current in 6-Q2 and 6-Q3 gate drive, amplitude is limited to ten volts DC by 7-R26 and 7-Z1, FIG. 7A.

The plus twelve volt output switching regulator Stage No. 3 is a push-pull forward convertor supplying twelve volts at 2.5 amperes and comprised of integrated circuit 7-U3, FIG. 7B, and power MOSFET's 6-Q4 and 6-Q5, FIG. 6A. The operation of components such as 6-T2, 6-CR9A, 6-CR9B, 6-C12, 6-L4, and 6-REG2 correspond with the operation of components 6-T1, 6-CR7A, 6-CR7B, 6-C8, 6-L3 and 6-REG1, as will be apparent to those skilled in the art from the preceding explanation. Accordingly a further description of the operation of switching regulator Stage No. 3 is not required.

OPERATION PLUS FIVE VOLT OUTPUT SWITCHING REGULATOR STAGE NO. 4

Power transistor 6-Q1, FIG. 6A, is utilized in a traditional bucking regulator topology to generate plus five volts D.C. at ten amperes. Integrated circuit 7-U1, FIG. 7A, provides complete pulse width modulation, output short circuit protection and gate drive for the power MOSFET 6-Q1. Integrated circuit 7-U1 includes a five volt D.C. (plus or minus one percent) reference and two transistor output switches.

A feedback loop comprised conductor 7-615, FIG. 7A, maintains output voltage regulation and includes a voltage divider 7-R14 and 7-R21. Selection of the resistance value for 7-R14 will determine the regulated output voltage which will typically be set between 5.10 VDC and 5.25 VDC. The error amplifier of integrated circuit 7-U1 is compensated by 7-C2 and 7-R4, FIG. 7A, which ensure stability of the regulator under all operating conditions. Voltage divider 7-R2 and 7-R3 sets the dead time control voltage at approximately 1.03 VDC. Resistor 7-R1 and capacitor 7-C1 determine the frequency of oscillation which is near forty kilohertz. Modulator 7-U1 has both collectors tied to VIN; when saturated, the paralleled transistors drive the gate of 6-Q1 with switching pulses. As the input voltage of the power supply decreases, normally gate voltage amplitude would diminish. In this embodiment, a special booster winding 6-T6B of transformer 6-T6, FIG. 6A, which is not found in conventional designs, has been added to boost the gate amplitude above VIN. This booster winding is capacitively coupled through 6-C20 to the gate of 6-Q1. The other side of this winding is connected via 710, FIG. 7A, to terminals E1 and E2, and thus to the emitters of the integrated circuit 7-U1. This connection places a boosted voltage in series with the input voltage. During initial power-up, 6-CR1 is forward bias and 6-Q1 is switched on without the aid of the booster winding. When the winding generates enough voltage to reverse bias 6-CR1, the gate voltage will be greater than VIN when measured with respect to ground. Maximum gate to source voltage is held constant through zener current limiting resistor 6-R9 and zener 6-CR2. Resistor 6-R8 has been added to directly discharge the gate capacitance 6-Q1 to ground, guaranteeing turn-off. Without 6-R8, the gate 6-Q1 remains charged, allowing VIN to flow directly through to the five volt output. Under these circumstances, the fuse blowing crowbar 6-SCR1, FIG. 6B, would trip blowing fuse 6-F1 so as to protect the load. This condition is especially noticed during under/overvoltage lockouts and load variations. Once the gate capacitance is charged, 6-Q1 turns on, reverse biasing 6-CR3 and supplying sufficient energy to primary winding 6-T6A, FIG. 6A, so that a continuous current flow will be supported through 6-T6 and the load during the "off" time. During the "off" time, Schottky barrier rectifier 6-CR3, FIG. 6A, allows energy, previously stored in transformer 6-T6 and smoothed by 6-C9, 6-C10, 6-C11, 6-C12, to discharge through the load. Tantalum capacitor 6-C1, FIG. 6B, is parallel with the output to provide a low impedance to high frequency spikes.

Current limiting is accomplished using the current limit amplifier within integrated circuit 7-U1. Current sense resistor 6-R1, FIG. 6B, and voltage divider 6-R4 and 6-R5, FIG. 6B, are used to sense an overload condition. Resistor 6-R4 may be scaled to preset the required current limit from one hundred ten percent to one hundred thirty percent overload. Capacitor 7-C11 reduces high frequency noise on the current limiting amplifier input through common mode rejection. Resistor 7-R20 provides a positive input bias to the inverting input of the current limiting amplifier for guaranteed regulator start-up. Ferrie beads 6-FB1 and 6-FB2 are not a function of the current limiter, but are a novel means to reduce high frequency noise.

The fuse blowing crowbar circuit including transistor 6-SCR1 provides protection against any overvoltage condition which might occur on the five volt output 615, FIG. 6B, because of operator error or failure within the power supply or load. During an overvoltage condition (6.2 VDC), 6-CR4 will conduct firing 6-SCR1, shorting plus V at 6-408, FIG. 6A, to ground and blowing fuse 6-F1. The input voltage is now removed from the supply, effectively protecting the load. Resistors 6-R2 and 6-R3 and capacitor 6-C13 set the crowbar's response time to an overvoltage situation without a delay. These components thus prevent nuisance crowbar conditions. Otherwise noise or momentary spikes may inadvertently fire the crowbar.

Regulator 7-U4, FIG. 7B, senses the battery voltage by means of voltage divider 7-R12 and 7-R19, and compares it against the voltage reference on pin four of 7-U4. As the battery discharges, the sense voltage will decrease below the reference voltage, causing the output of the integrated circuit 7-U4 to cease base current to 7-Q1, opening the relay 4-K1, FIG. 4B, and thus preventing a repeated cycle. Battery cutoff voltage may be between 10.20 and 10.80 VDC.

Custom transformer 4-T5, FIG. 4A, is equipped with a booster winding 4-T5C to raise the regulated 14.80 VDC to seventeen volts DC which charges 4-C32, FIG. 4B. Regulator 4-REG3, FIG. 4B, regulates the charging voltage to 14.10 VDC at twenty five degrees Celsius and limits charging current to 1.5 amperes. This charging scheme provides temperature compensation by adding 4-Q7, 4-R38, 4-R43, and 4-R40. In a traditional configuration, 4-R41 would be connected to ground and regulator REG3 would have its output voltage determined by 4-R39 which is a fixed constant and 4-R41. Transistor 4-Q7 when connected between 4-R41 and ground effectively degrades regulation with variation in temperature for achievement of temperature compensation. Temperature compensation provides an approximately five millivolts reduction per degree Celsius for each degree Celsius increase in ambient temperature. Resistor 4-R43 can be test selected if a float voltage of plus or minus one percent accuracy is desired. Since transistor 4-Q7 is not in physical contact with the battery, a correction factor will be applied to prevent over damping of the output voltage of 4-REG3.

Point of Sale System

A preferred point of sale system in which the illustrated power supply has been used is shown in greater detail in an application for patent of Arvin D. Danielson, Lyndon L. Dunbar, Kevin L. Fischer, Edward R. Miller and Thomas William Pepper, Jr. entitled: "PROCESSING MEANS AND TERMINAL INCORPORATING SAME, PARTICULARLY FOR POINT OF SALE SYSTEMS", U.S. Ser. No. 061,341 filed June 10, 1987, being filed of even date herewith, and the disclosure including the drawings of said application for patent is hereby incorporated herein by reference.

In testing the board of FIG. 5, prior to assembly with the system, a test device which simulates the power supply connects with lines 511, 512 and 513, FIG. 5.

Figure 8:
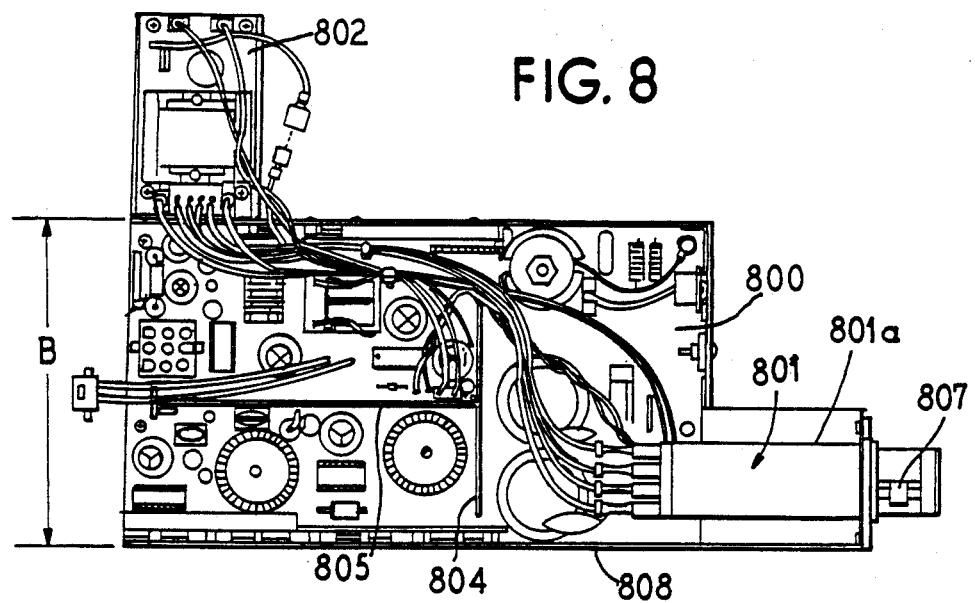
FIG. 8 is a somewhat diagrammatic plan view showing a physical embodiment of the circuitry of FIGS. 3, 4A, 4B, 5, 6A, 6B, 7A and 7B.
Figure 11:
FIG. 11 is a diagrammatic end view of the board of FIG. 10 indicating a stake-header mounting for the board.
Figure 10:
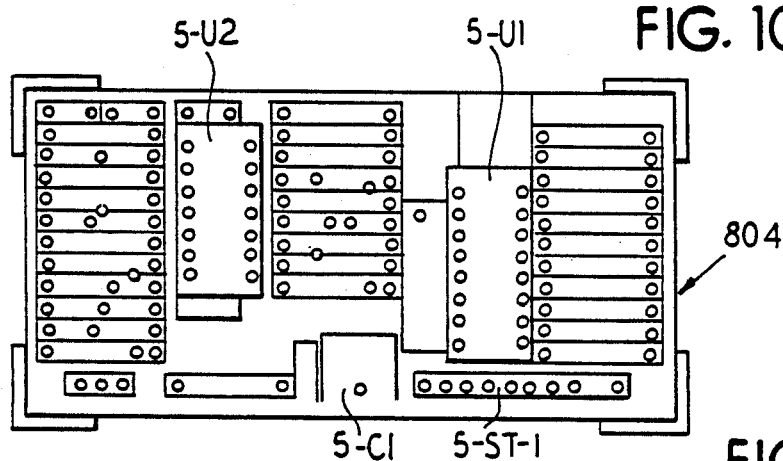
FIG. 10 is a somewhat diagrammatic plan view showing the layout of parts for a control board carrying the circuitry of FIG. 5.
Figure 12:
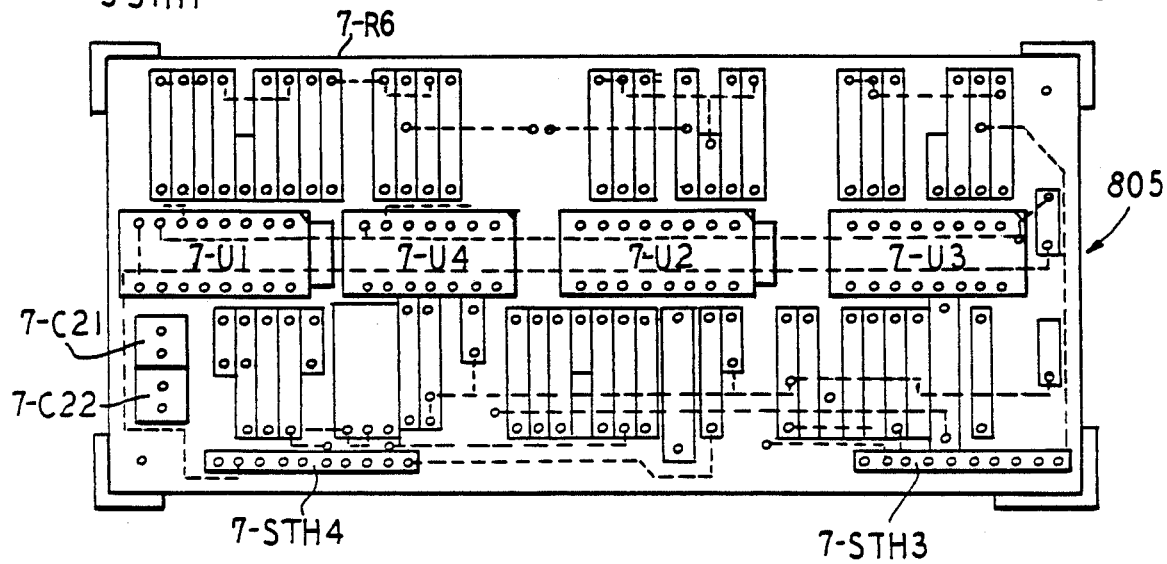
FIG. 12 is a somewhat diagrammatic plan view indicating the layout of components for a physical embodiment of the electric circuit of FIGS. 7A and 7B.
Figure 8A:
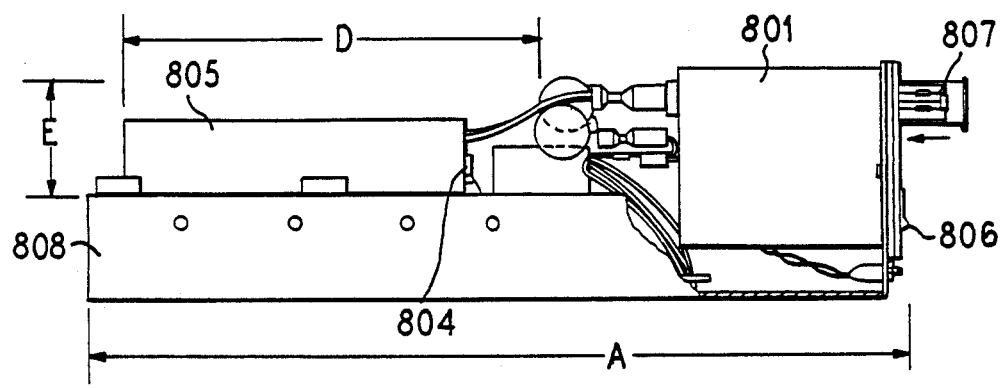
FIG. 8A is a diagrammatic side elevational view of the embodiment of FIG. 8.
Figure 8B:
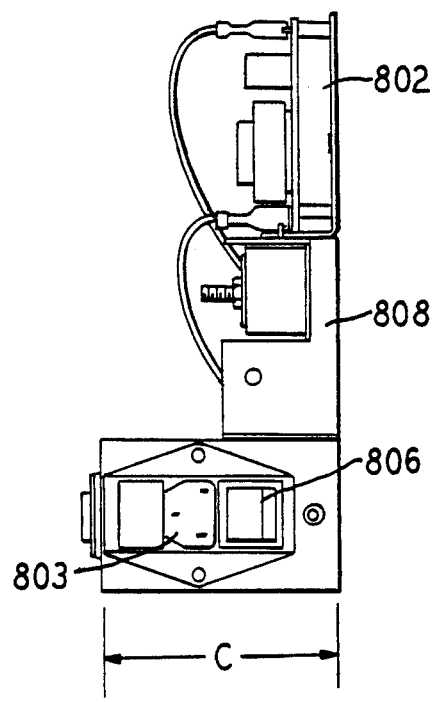
FIG. 8B is a diagrammatic end elevational view of the embodiment of FIG. 8.

In FIGS. 8, 8A and 8B, the following parts may be noted:

800 main power supply printed circuit board (see FIG. 9)
801 line filter (see 2-31, FIG. 2)
802 auxiliary regulator printed circuit board (see FIG. 3)
803 receptacle for 110 volts AC or 220 volts AC
804 power supply controller board (see FIG. 5)
805 power supply control board (see FIGS. 7A and 7B)
806 manual power switch
807 fuse (shown pulled out)
808 main power supply chassis In FIGS. 8, 8A and 8B, the overall length dimension of the switching power supply (with fuse 807 inserted) is indicated at A and is about 10¾ inches; the width of the main power chassis is designated B and is about 4⅝ inches; while the overall maximum height C is about 3⅛ inches. The regulator board 802 is not part of the switching power supply, and has been attached at side 801a of filter 801 where it does not affect the overall width. The dimensions D and E may have values of about six inches and about 1.5 inches and represent essentially empty space which could be subtracted from an overall volume of about eleven inches by about five inches by about three inches (165 cubic inches). Thus the volume occupied by the switching power supply is less than one hundred and sixty-five cubic inches.

Figure 13:
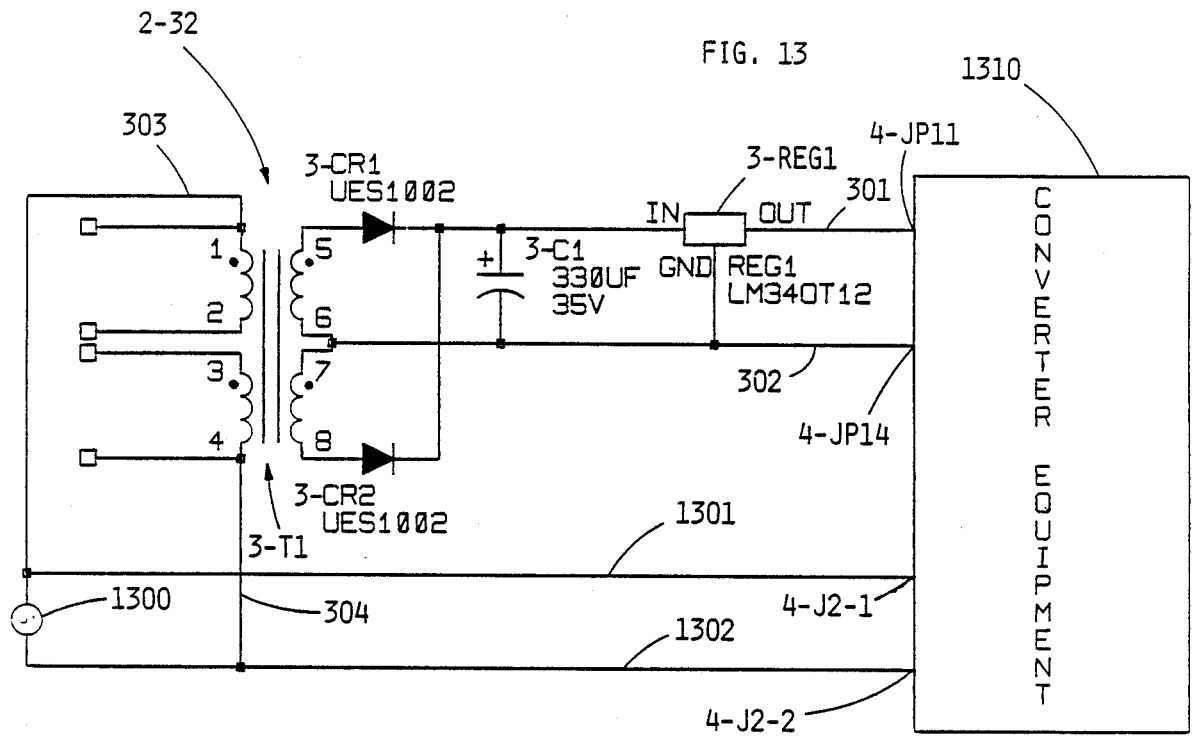
FIG. 13 is a diagrammatic view showing an AC supply for the circuitry of FIG. 3, and for the converter equipment of FIGS. 4A–7F, and illustrating the interconnections therebetween, for use in explaining start-up operation in the AC mode.

Description of FIG. 13

FIG. 13 shows elements from FIG. 3 which bear the same reference numerals, and will serve as a basis for summarizing start-up operation of the embodiment of FIGS. 3–7F.

Figure 4F:
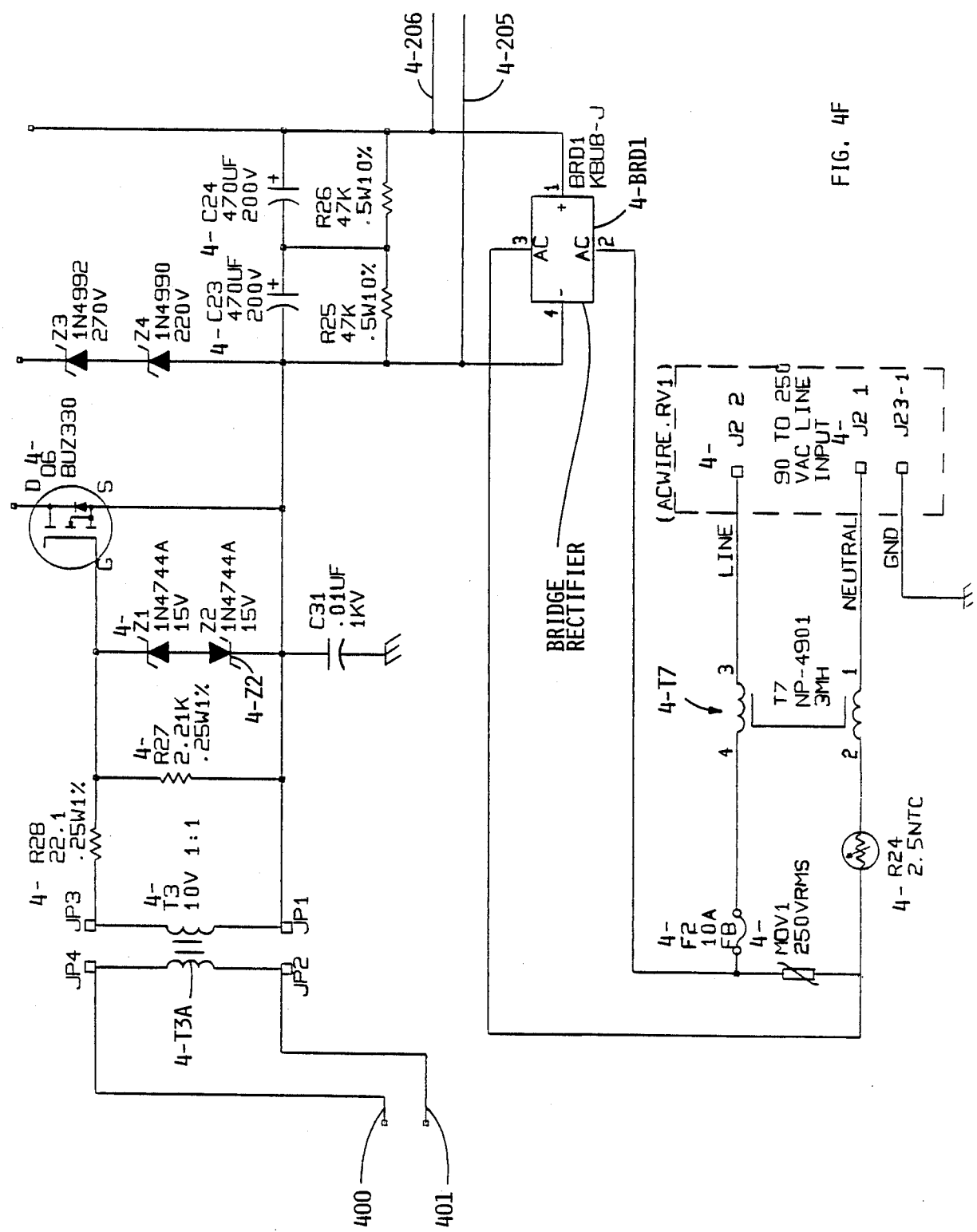

Reference numeral 1300 represents an alternating current source which may be coupled via lines 1301 and 1302 with terminals 4-J2-1 and 4-J2-2 as indicated in the lower right of FIG. 4F. The source 1300 may supply alternating current power, e.g. between ninety and two hundred and fifty volts, to the primary of transformer 3-T1 via lines 303 and 304. The regulator 3-REG 1 supplies twelve volts DC at lines 301, 302. This output is connected to terminals 4-JP11 (+VIN AUX REG BOARD) and 4-JP14 (COMMON), FIG. 4D, and from there is supplied to +VIN and COMMON lines, 501, FIG. 5C, 502, FIG. 5A, and 700, FIG. 7A, and 701, FIG. 7D, so as to supply start-up potential to pulse width modulator regulator 5-U1, FIG. 5C, component 5-U2, FIG. 5A, and components 7-U1, 7-U2, FIG. 7B, and 7-U3, 7-U4, FIG. 7E, of converter equipment 1310.

If during operation, the AC source 1300 fails, the battery associated with 4-J4, FIG. 4B, will supply power via relay 4-K1, line 410, and rectifier 4-CR17B, FIG. 4B.

Figure 14:
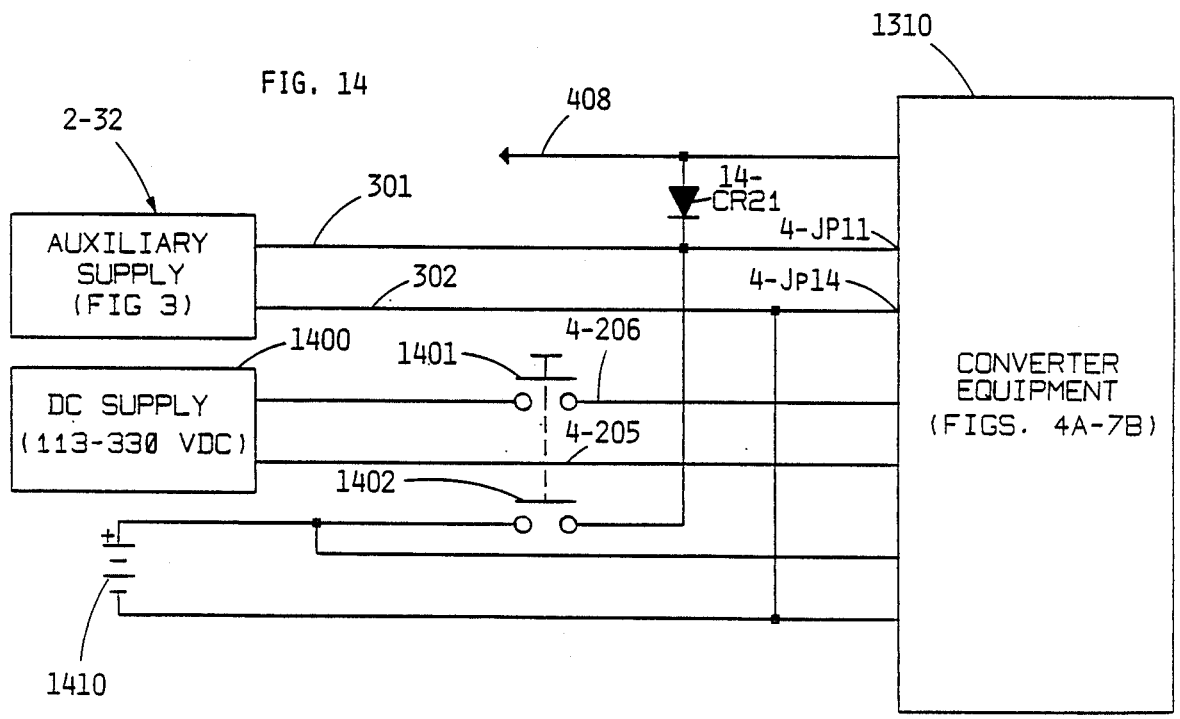
FIG. 14 is a diagrammatic view illustrating an embodiment for momentarily applying battery potential to the circuitry of FIGS. 4A–7F to effect start-up, with a DC supply providing energizing power during operation.

Description of FIGS. 14–16

FIGS. 14–16 illustrate various ways of supplying start-up potential to components 5U1, 5U2, and 7U1–7U4 for the case where a D.C. supply 1400 is connected to lines 4-205, 4-206, FIG. 4A, via a manual switch 1401.

In FIG. 14, a momentary switch 1402 is provided between a positive battery terminal of battery 1410 and the conductor 301 of the auxiliary supply circuit 2-32. As indicated at 14-CR21, a diode is connected between the DC power output line 408 of the circuit of FIGS. 4A–4F and line 301, so as to decouple the battery from the output load on line 408. With the blocking action of 14-CR21, the battery 1310 need only provide 0.060 ampere for less than six microseconds after the soft start capacitor has charged. The low initial auxiliary power current demand allows the equipment 1310 of FIGS. 4A–7F to become activated even if battery 1410 has discharged to its cutoff voltage of 10.5 volts. Once the controller 5-U1 drives 4-Q6, FIG. 4F, into conduction via outputs 5-400 and 5-401, FIG. 5C, and 400, 401, FIG. 4E and FIG. 4F, and transformer 4-T3, FIG. 4F, the output voltage at 408 supplies the voltage +VIN for operation of components 5U1, 5U2, 7U1–7U4, and effects recharging of the battery 1410 via line 406, FIGS. 4A–4C and regulator 4-REG3, FIG. 4B. At this time, the momentary contact 1402 has openened.

FIG. 15 is similar to FIG. 14 except that the momentary contact 1402 connects the positive battery terminal to a point 1500 which is common to the cathodes of rectifiers 3-CR1 and 3-CR2. The cathode of diode 15-CR21 is connected to common point 1500, so that sustaining operating potential for components 5-U1, 5-U2, and 7U1–7U4 comes from the output line 408. Such operating potential in FIG. 15 is supplied via regulator 3-REG1 as in the case of FIG. 13.

In FIG. 16. D.C. supply 1400 is connected with a start-up oscillator 1600 which provides its DC output potential to the common point 1500. This enables start-up with or without the presence of battery 1410, and for this reason is a preferred approach. The start-up oscillator 1600 may correspond generally with component 5-U1, FIG. 5, but would operate with an input voltage range from e.g. 113 V DC to 330 VDC, and would provide, in conjunction with regulator 3-REG1, isolated plus twelve volts DC at 0.2 ampere.

The auxiliary power arrangement of FIG. 16 would be capable of operating from +270 VDC which is common in shipboard power supplies, and for such an application would serve to eliminate sixty hertz transformers of present commercial designs, and also eliminate four hundred hertz aircraft transformers which are presently utilized.

It will be apparent that many modifications and variations may be effected without departing from the scope of the teachings and concepts of the present disclosure.

What is claimed is:

1. In a power supply, power supply transformer means having primary
   winding means and secondary winding means, rectifier means having alternating polarity input means
      for receiving input alternating current potentials over a range from about one hundred volts r.m.s. to at least about two hundred and twenty volts r.m.s., and having unidirectional output means, control circuit means including current control switch means interposed between said unidirectional output means and said primary winding means for supplying generally constant volt-second product to said primary winding means for input alternating current potentials over said range between about one hundred volts and at least about two hundred and twenty volts, and direct current input means coupled between said unidirectional output means and said current control switch for receiving direct current input voltages over a range from about one hundred and thirteen volts to about three hundred and thirty volts, said current control switch means being selectively energizable for activating said primary winding means in response to alternative current power applied to said alternating polarity input means and in response to direct current power applied to said direct current input means.

2. In a power supply according to claim 1, said control circuit means maintaining a constant volt-second product within plus or minus ten percent for input alternating current potentials over a range between about ninety-five volts r.m.s. and about two hundred and fifty volts r.m.s. at a frequency between fifty and sixty Hertz.

3. In a power supply according to claim 1, said control circuit means comprising pulse width modulation means for maintaining a selected output unidirectional potential and for limiting unidirectional current flow from the unidirectional output means.

4. In a power supply according to claim 1, said control circuit means operating said current control switch means at a frequency of greater than about forty kilohertz.

5. In a power supply according to claim 1, said control circuit means operating said current control switch means at a frequency greater than eighty kilohertz.

6. In power supply according to claim 1, said control circuit means operating said current control switch means at a frequency of about eighty-eight kilohertz.

7. In a power supply according to claim 1, said control circuit means operating said current control switch means with an on-time per cycle between about five microseconds and about two microseconds.

8. In a power supply according to claim 1, said control circuit means operating said current control switch means to provide a peak working flux density in said power supply transformer means of about fifteen hundred gauss over a range of peak input voltages between about one hundred and fifteen volts (DC) and about three hundred volts (DC).

9. In a power supply according to claim 8, said power supply transformer means having a saturation flux density of about three thousand gauss at one hundred degrees Celsius.

10. In a power supply according to claim 8, said control circuit means operating said current control switch means to provide a peak working flux density of about 1550 gauss at an input alternating current potential of about ninety volts r.m.s. and of about 1540 gauss at an input alternating current potential of about two hundred and fifty volts r.m.s., with a peak ripple voltage of about fifteen volts.

11. In a power supply according to claim 8, said primary winding means having a power supply primary winding with about thirty turns, and said power supply transformer means having a magnetic core with a saturation flux density of about three thousand gauss at one hundred degrees Celsius and has an effective cross sectional area of about 1.4 centimeters squared.

12. In a power supply according to claim 8, said alternating polarity input means receiving an input power greater than about sixty watts, and said secondary winding means supplying output power with an efficiency greater than seventy percent.

13. In a power supply according to claim 8, said alternating polarity input means receiving an input power between about sixty watts and about eighty watts and said secondary winding means supplying output power with an efficiency of about eighty percent.

14. In a power supply,
power supply transformer means having primary winding means and secondary winding means,
rectifier means having alternating polarity input means for receiving input alternating current potentials over a range from about one hundred volts r.m.s. to at least about two hundred and twenty volts r.m.s., and having unidirectional output means, and
control circuit means including current control switch means interposed between said unidirectional output means and said primary winding means for supplying generally constant volt-second product to said primary winding means for input alternating current potentials over said range between about one hundred volts and at least about two hundred and twenty volts,
further rectifier means coupled with the secondary winding means and having a rectifier output for supplying relatively low voltage unidirectional current,
plural converter stages for selective coupling in parallel with said secondary winding means,
power "OR" means having first and second inputs, and having power "OR" output means coupled with said plural converter stages, and
standby battery coupling means connected with the second input of said power "OR" means for selectively coupling standby battery power with said plural converter stages.

15. In a power supply according to claim 14, said power supply during operation from alternating current power providing an efficiency of about seventy-eight percent.

16. In a power supply according to claim 15, said power supply during operation from standby battery power providing an efficiency in the range between about eighty-three percent and about eighty-five percent.

17. In a power supply according to claim 16, said plural converter stages supplying an output power greater than about forty watts.

18. In a power supply according to claim 16, said plural converter stages supplying a maximum output power of greater than about one hundred and twenty watts.

19. In a power supply according to claim 16, said plural converter stages supplying a peak output power of greater than about two hundred and eighty watts.

20. In a power supply according to claim 19, said power supply occupying a rectilinear space with a volume less than that corresponding to overall dimensions of about eleven by five by three inches.

21. In a power supply,
   power supply transformer means having primary winding means and secondary winding means,
   rectifier means having alternating polarity input means for receiving input alternating current potentials over a range from about one hundred volts r.m.s. to at least about two hundred and twenty volts r.m.s., and having unidirectional output means, and
   control circuit means including current control switch means interposed between said unidirectional output means and said primary winding means for supplying generally constant volt-second product to said primary winding means for input alternating current potentials over said range between about one hundred volts and at least about two hundred and twenty volts,
   plural converter stages coupled in parallel with said secondary winding means, said plural converter stages supplying a maximum output power greater than about one hundred watts, and said power supply occupying a rectilinear space with a volume of less than about one hundred and sixty-five cubic inches, and
   respective individual independent feedback pulse width modulation control circuits in the respective converter stages.

22. In a power supply according to claim 21, said power supply supplying a peak output power greater than about two hundred watts and said power supply occupying a rectilinear space with a volume of less than about one hundred and sixty-five cubic inches.

23. In a power supply according to claim 21, said control circuit means operating said current control switch means at a frequency greater than forty kilohertz, and said plural converter stages being operated in a pulse width modulation mode at a frequency of about thirty kilohertz or higher.

24. In a power supply according to claim 21, said control circuit means operating said current control switch means at a frequency greater than about eighty kilohertz, and said plural converter stages being operated in a pulse width modulation mode at a frequency of about thirty kilohertz or higher, said power supply occupying a space between two parallel planes separated by a height dimension of about three inches, and occupying an area of about fifty-five square inches.

* * * * *